United States Patent
Cho

(10) Patent No.: US 8,502,788 B2
(45) Date of Patent: Aug. 6, 2013

(54) MOBILE TERMINAL USING FLEXIBLE DISPLAY AND METHOD OF CONTROLLING THE MOBILE TERMINAL

(75) Inventor: Young Min Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 515 days.

(21) Appl. No.: 12/606,105

(22) Filed: Oct. 26, 2009

(65) Prior Publication Data
US 2010/0117975 A1    May 13, 2010

(30) Foreign Application Priority Data
Nov. 10, 2008    (KR) .................. 10-2008-0111152

(51) Int. Cl.
*G06F 3/041*    (2006.01)

(52) U.S. Cl.
USPC ............................................ 345/173

(58) Field of Classification Search
USPC ............... 345/1.1, 4, 30, 156, 157, 173–178, 345/698; 349/1; 178/18, 19; 368/82; 251/40; 361/681
See application file for complete search history.

(56) References Cited

U.S. PATENT DOCUMENTS

| 2008/0291225 A1* | 11/2008 | Arneson ..................... 345/698 |
| 2008/0303782 A1* | 12/2008 | Grant et al. .................. 345/156 |
| 2008/0305836 A1* | 12/2008 | Kim et al. ..................... 455/564 |

* cited by examiner

*Primary Examiner* — Alexander S Beck
*Assistant Examiner* — Tony N Ngo
(74) *Attorney, Agent, or Firm* — Lee, Hong, Degerman, Kang & Waimey

(57) ABSTRACT

A mobile terminal including a body and a display module, which is flexible and is capable of receiving a touch input and a method of controlling the mobile terminal are provided. The method includes setting the touch sensitivity of a display module to a first level; if the display module is bent or folded, setting the touch sensitivity of a bent or folded portion of the display module to a second level; and if the display module is unbent or unfolded and thus returns to its original shape, setting the touch sensitivity of the bent or folded portion of the display module back to the first level. Accordingly, it is possible to adaptively adjust the touch sensitivity of the display module according to whether and how the display module is bent or folded.

14 Claims, 34 Drawing Sheets

(a)　　　　　　　　(b)　　　　　　　　(c)

(a)    (b)

(a)  (b)

(b)

(a)

(a) (b)

(a)  (b)

MOBILE TERMINAL USING FLEXIBLE DISPLAY AND METHOD OF CONTROLLING THE MOBILE TERMINAL

CROSS-REFERENCE TO RELATED APPLICATION

This application claims the priority benefit of Korean Patent Application No. 10-2008-0111152, filed on Nov. 10, 2008 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, in which the touch sensitivity of a flexible display can be adaptively adjusted according to the degree to which the flexible display is bent or folded.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD), a flexible display or a touch screen has steadily grown due to a growing tendency of considering mobile terminals as personal items that can represent personal individuality.

Since flexible displays are flexible enough to be bent or rolled, they can thus be used to control various operations performed by mobile terminals. When using a flexible display in a mobile terminal, it is necessary to determine whether the flexible display is bent or folded, and the direction in which, and the degree to which the flexible display is bent or folded. Especially when using a display module, which is a combination of a touch screen and a flexible display, it is necessary to adjust the touch sensitivity of the display module and correct the position of a touched input on the display module according to whether the display module is bent or folded and thus to precisely control various operations associated with a touch event.

SUMMARY OF THE INVENTION

The present invention provides a mobile terminal and a method of controlling the mobile terminal, in which the touch sensitivity of a flexible display can be adaptively adjusted according to a change in the shape of the flexible display.

According to an aspect of the present invention, there is provided a method of controlling a mobile terminal including a body and a display module, which is flexible and is capable of receiving a touch input, the method including setting the touch sensitivity of the display module to a first level; if the display module is bent or folded, setting the touch sensitivity of a bent or folded portion of the display module to a second level; and if the display module is unbent or unfolded and thus returns to its original shape, setting the touch sensitivity of the bent or folded portion of the display module back to the first level.

According to another aspect of the present invention, there is provided a mobile terminal including a body; a display module configured to be provided on the body and to be flexible and capable of receiving a touch input; and a controller configured to set the touch sensitivity of the display module initially to a first level, wherein, if the display module is bent or folded, the controller sets the touch sensitivity of a bent or folded portion of the display module to a second level, and if the display module is unbent or unfolded and thus returns to its original shape, the controller sets the touch sensitivity of the bent or folded portion of the display module back to the first level.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
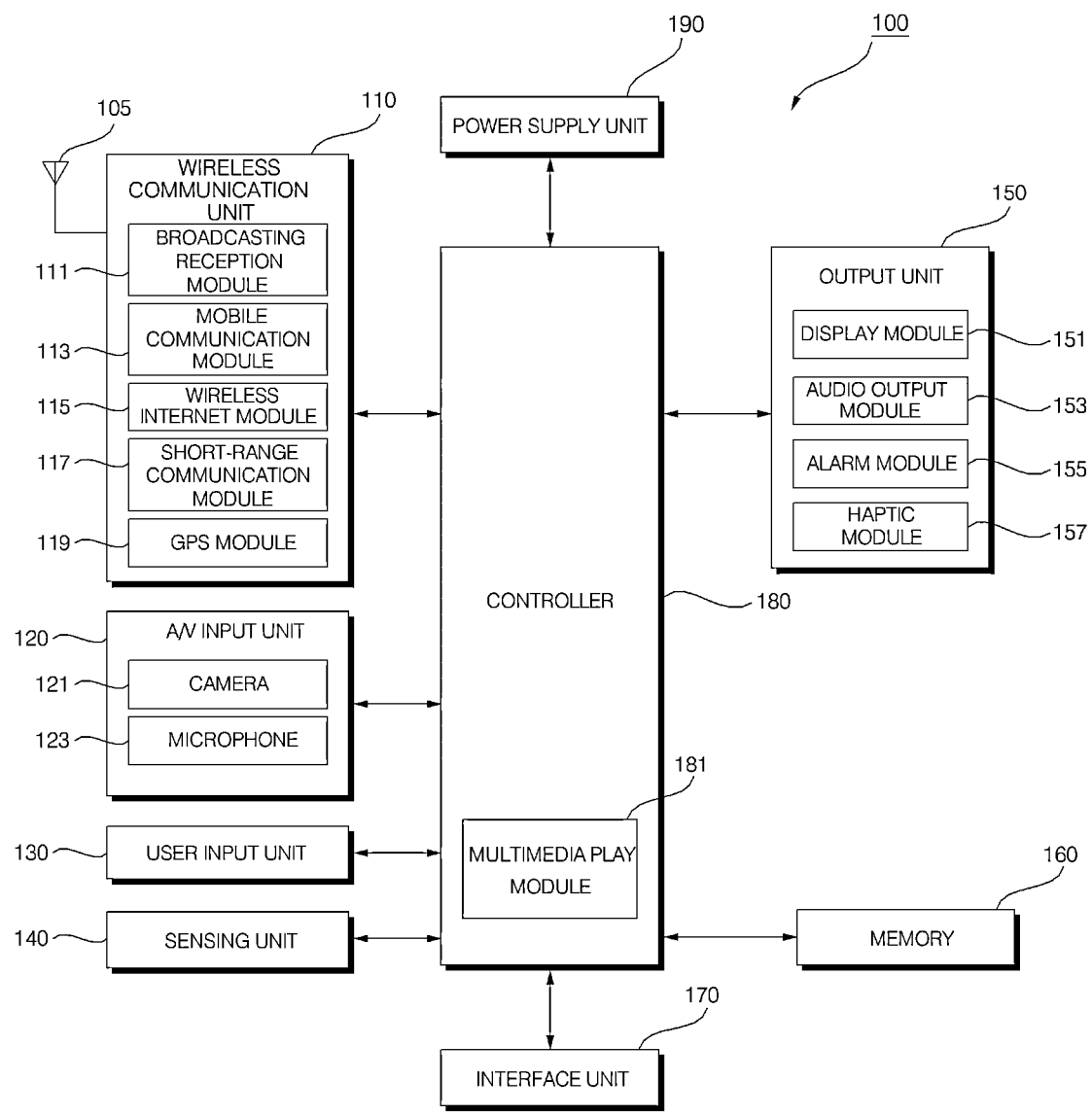
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor in a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor (not shown), a pressure sensor (not shown) and an acceleration sensor (not shown). The proximity sensor may detect the existence of an object nearby without any mechanical contact by detecting a variation in an alternating magnetic field or a static magnetic field or a variation in static capacitance. The sensing unit 140 may include two or more proximity sensors.

The pressure sensor may determine whether pressure is being applied to the mobile terminal 100 or may measure the level of pressure, if any, applied to the mobile terminal 100. The pressure sensor may be installed in a certain part of the mobile terminal 100 where the detection of pressure is necessary. For example, the pressure sensor may be installed in the display module 151. In this case, it is possible to differentiate a typical touch input from a pressure touch input, which is generated using a higher pressure level than that used to generate a typical touch input, based on data provided by the pressure sensor. In addition, when a pressure touch input is detected from the display module 151, it is possible to determine the level of pressure applied to the display module 151 upon the detection of a pressure touch input based on data provided by the pressure sensor.

Acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary.

The sensing unit 140 may also include at least one of a motion sensor, a temperature sensor, a tension sensor, a current sensor, a tactile sensor, a slope sensor, a radio frequency (RF) sensor and an infrared (IR) sensor. Thus, when a flexible display is used as the display module 151, the sensing unit 140, the sensing unit 140 may provide a sensing signal indicating which part of the display module 151 is bent and the direction in which, and the degree to which the display module 151 is bent.

The output unit 150 may output an audio signal, a video signal and an alarm signal. The output unit 150 may include the display module 151, and an audio output module 153, an alarm module 155 and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel may be a transparent panel attached onto the exterior of the mobile terminal 100 and may be connected to an internal bus of the mobile terminal 100. The touch screen panel may keep monitoring whether the touch screen panel is being touched by the user. Once there is touch input detected from the touch screen panel, the touch screen panel may transmit a number of signals corresponding to the detected touch input to the touch screen panel controller. The touch screen panel controller may process the signals transmitted by the touch screen panel, and may transmit the processed signals to the controller 180. Then, the controller 180 may determine whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, a three-dimensional (3D) display and a transparent display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. Not only the alarm module 155 but also the display module 151 and the audio output module 153 may output an alarm signal in order to alert the user to the occurrence of an event.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 through 4. For convenience, assume that the mobile terminal 100 is a bar-type mobile terminal equipped with a flexible display. However, the present invention is not restricted to a bar-type mobile terminal. Rather, the present invention can be applied to various types of mobile phones, other than a bar-type mobile terminal.

Figure 2:
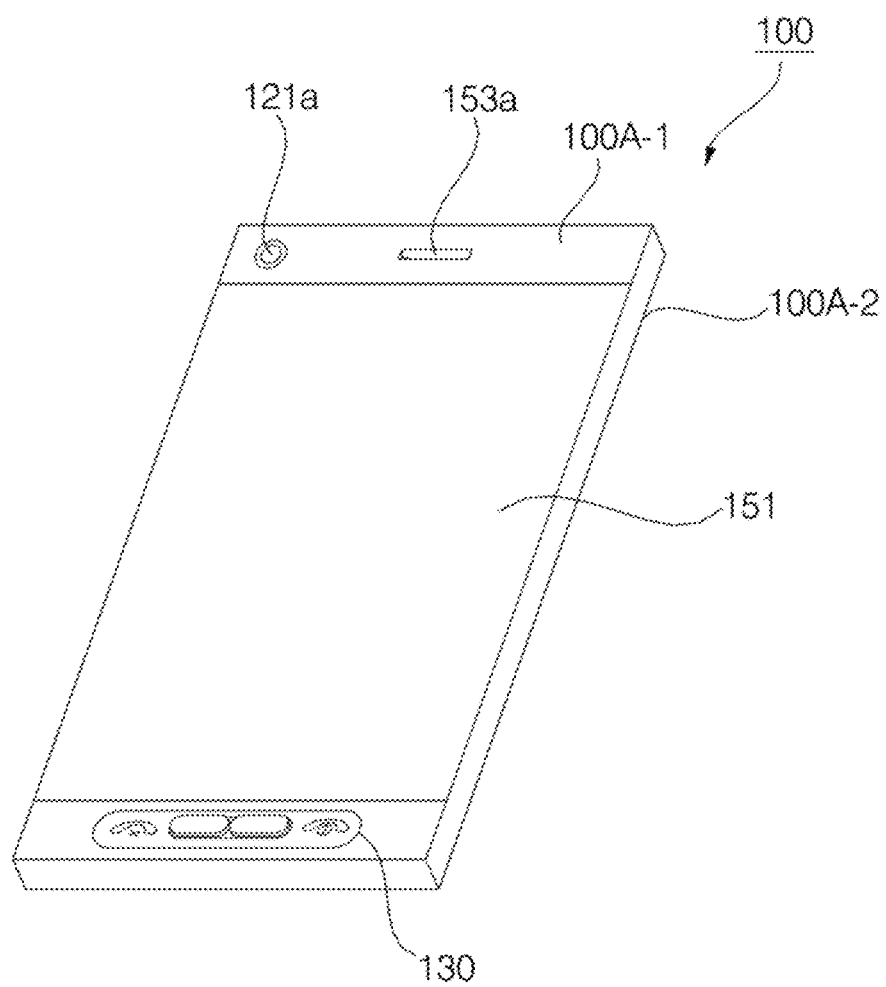
FIGS. 2 and 3 illustrate front perspective views of the mobile terminal shown in FIG. 1.
Figure 3:
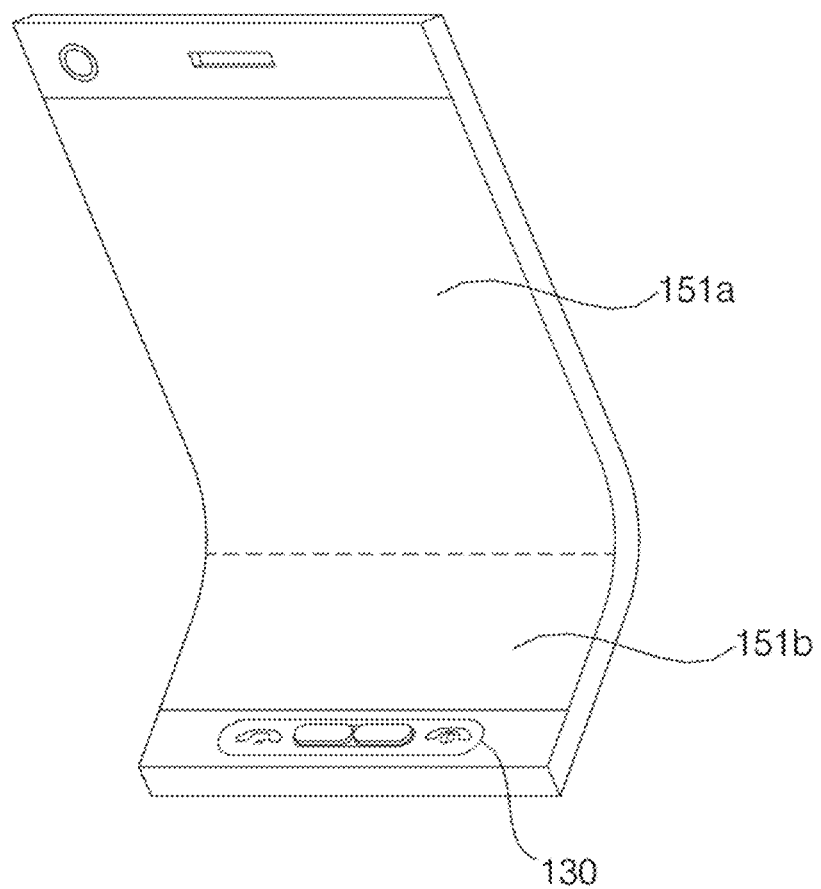

FIG. 2 illustrates a front perspective view of the mobile terminal 100 shown in FIG. 1. Referring to FIG. 2, the exterior of the mobile terminal 100 may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2.

The display module 151, a first audio output module 153a, a first camera 121a and the user input unit 130 may be disposed in the front case 100A-1.

The display module 151 may include a flexible display, which can visualize information and is flexible enough to be bent and folded. Since a touch pad is configured to overlap the display module 151 and thus to form a layer structure, the display module 151 may serve as touch screens. Thus, it is possible to input various information to the mobile terminal 100 simply by touching the display module 151.

The first audio output module 153a may be implemented as a receiver or a speaker. The first camera 121a may be configured to capture a still image or a moving image of the user.

The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The user input unit 130 may be used to input various commands such as 'start', 'end', and 'scroll' to the mobile terminal 100 or may be used as a hot key for activating certain functions of the mobile terminal 100.

The microphone 123 may be configured to be able to properly receive the voice of the user or other sounds.

A flexible display may be used as the display module 151. In this case, the display module 151 can be bent or folded, as shown in FIG. 3. More specifically, a flexible display capable of maintaining its shape after being bent or folded or a flexible display capable of returning to its original shape after being bent or folded may be used as the display module 151.

Figure 4:
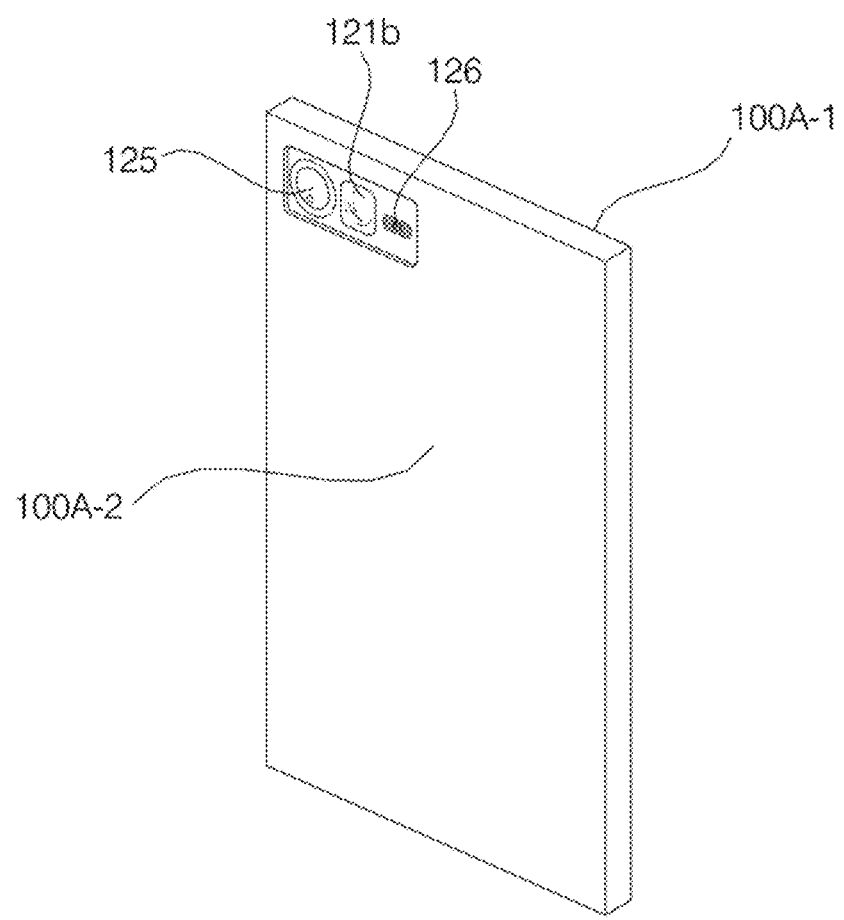
FIG. 4 illustrates a rear perspective view of the mobile terminal shown in FIG. 2.

FIG. 4 illustrates a rear perspective view of the mobile terminal 100 shown in FIG. 2. Referring to FIG. 4, the second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a cameral flash 126 may be disposed near the second camera 121b. The mirror 125 may be used for the user to prepare him- or herself for taking a self shot. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

An antenna (not shown) for receiving a broadcast signal may be disposed on one side of the rear case 100A-2. The antenna may be installed so as to be able to be pulled out of the rear case 100A-2.

The power supply unit 190 may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided on the rear case 100A-2 may be provided on the front case 100A-1. In addition, the first camera 121a may be configured to be rotatable and thus to cover the photographing direction of the second camera 121b. In this case, the second camera 121b may be optional.

The mobile terminal 100 may be embodied in various shapes other than those set forth herein. The mobile terminal 100 may be largely classified into a bar-type mobile terminal or a folder-type mobile terminal according to the shape of the body of the mobile terminal 100 or the position of a flexible display in the mobile terminal 100. The bar-type mobile terminal may be classified into a cylindrical, cylindroid, prism-shaped or freestyle mobile terminal. The folder-type mobile terminal may be classified into a folding, rolling or hybrid mobile terminal.

Figure 5:
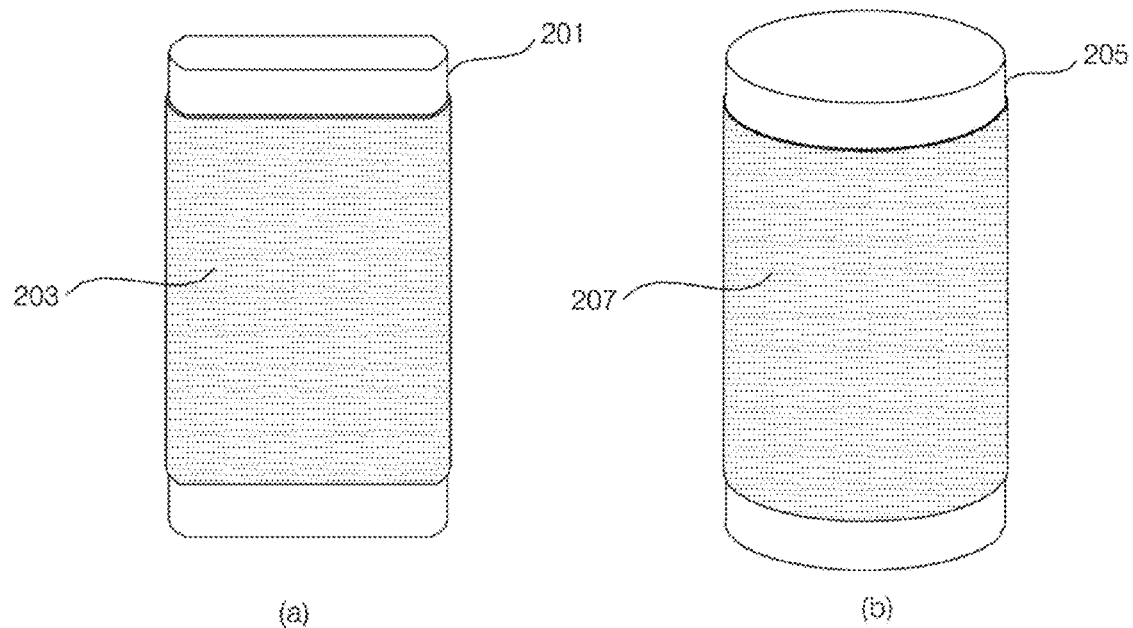
FIGS. 5 through 8 illustrate various types of full-display-type cylindroid mobile terminals and various types of full-display-type cylindrical mobile terminals.

FIGS. 5(*a*) and 5(*b*) illustrate a full-display-type cylindroid mobile terminal and a full-display-type cylindrical mobile terminal, respectively. Referring to FIG. 5(*a*), the full-display-type cylindroid mobile terminal may include a body 201 which is cylindroid, and a flexible display 203 which is attached onto the body 201, surrounding the outer circumferential surface of the body 201. Referring to FIG. 5(*b*), the full-display-type cylindrical mobile terminal may include a body 205 which is cylindrical, and a flexible display 207 which is formed on the body 205, surrounding the outer circumferential surface of the body 205. The flexible displays 203 and 207 may be flexible enough to be bent or folded, and may thus allow the outer circumferential surfaces of the bodies 201 and 205 to be used as display regions.

The flexible display 203 or 207 may be used as a single display, and thus, a single operation screen may be displayed on the entire flexible display 203 or 207. Alternatively, the flexible display 203 or 207 may be divided into a number of display regions, and then, different operation screens may be displayed in the respective display regions. By using an acceleration sensor, it is possible to uniformly maintain the direction of display of a screen on a certain part of the flexible display 203 or 207 regardless of the rotation of the body 201 or 205.

Figure 6:
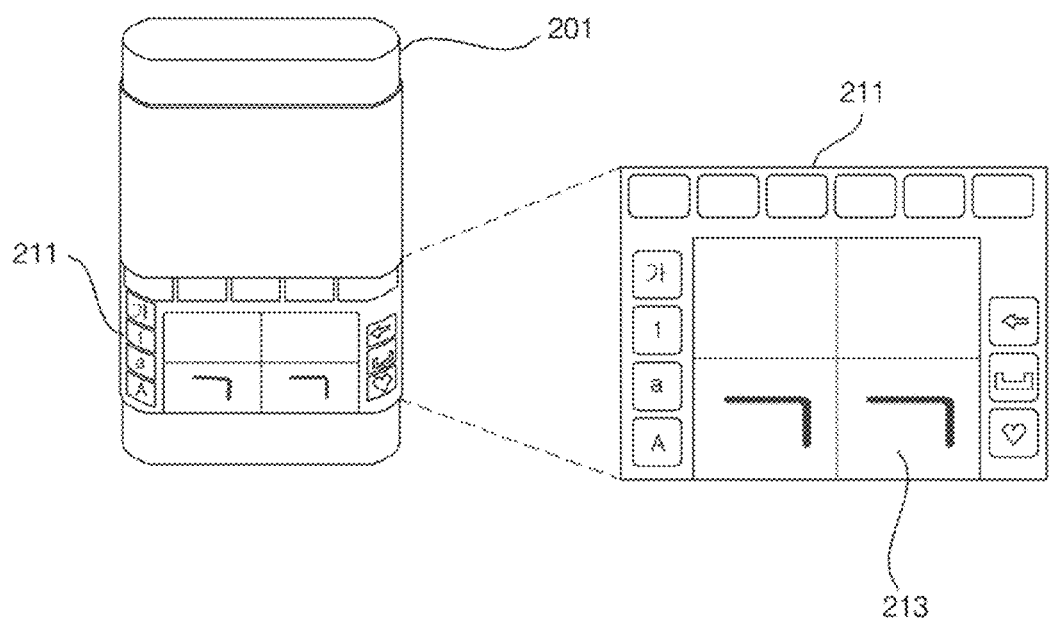
Figure 7:
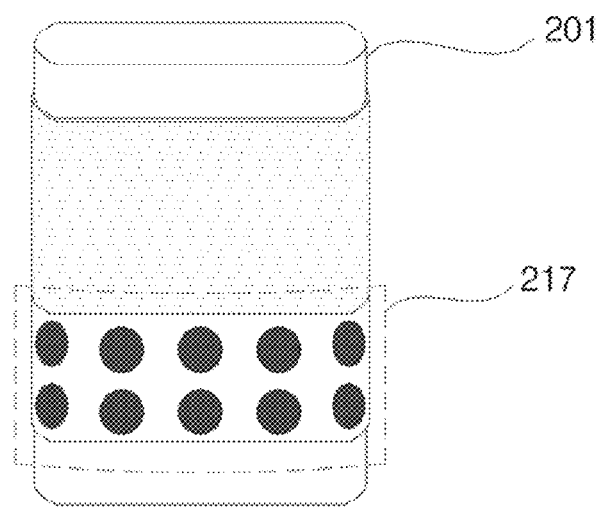

FIGS. 6 and 7 illustrate various input devices for use in the cylindroid mobile terminal shown in FIG. 5(*a*). Referring to FIG. 6, a certain part of the flexible display 203 may be used as a touch keypad input window 211. A certain part of the touch keypad input window 211 may be used as a handwritten input recognition window 213. Alternatively, referring to FIG. 7, a dome keypad 217 may be installed on the body 201. Still alternatively, a touch sensor or a tactile sensor may be installed on the body 201 and may thus be used as an input device.

Figure 8:
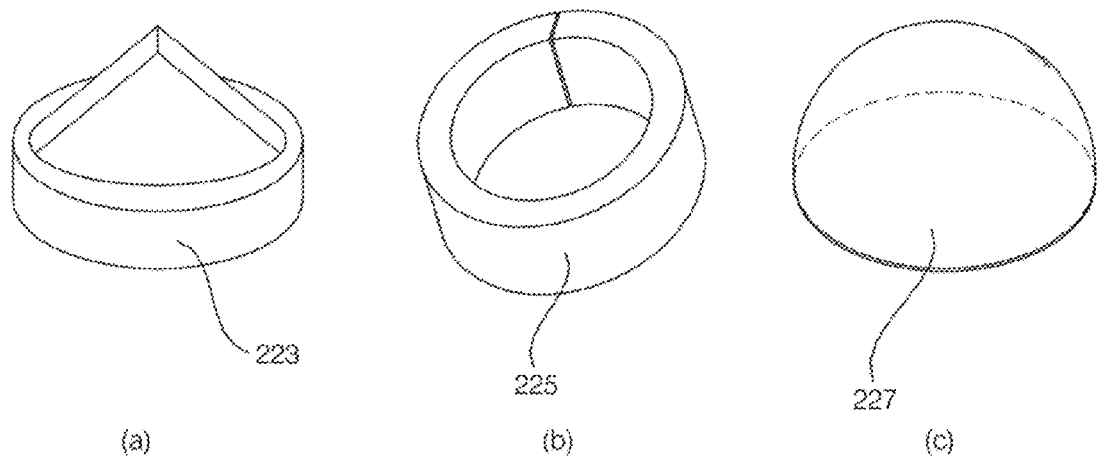

FIGS. 8(*a*) through 8(*c*) illustrate other various types of full-display-type cylindroid or cylindrical mobile terminals. Referring to FIGS. 8(*a*) through 8(*c*), a full-display-type cylindroid or cylindrical mobile terminal may be manufactured in various shapes other than a cylindroid or a cylinder, and a flexible display 223, 225 or 227 may be installed along the outer circumferential surface of the full-display-type cylindroid or cylindrical mobile terminal.

Figure 9:
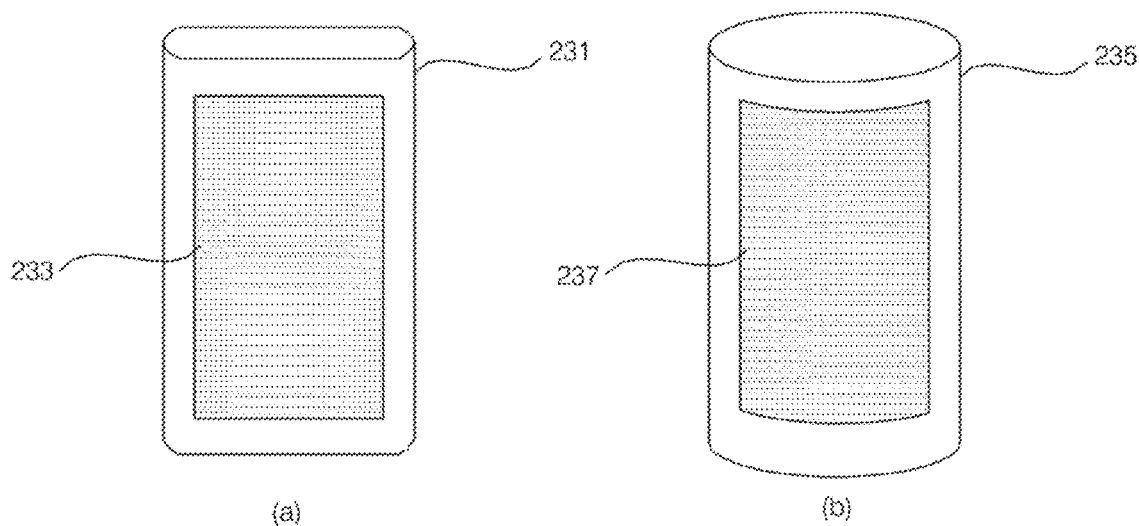
FIGS. 9 through 13 illustrate various types of partial-display-type cylindroid mobile terminals and various types of partial-display-type cylindrical mobile terminals.

FIGS. 9(*a*) and 9(*b*) illustrate a partial-display-type cylindroid mobile terminal and a partial-display-type cylindrical mobile terminal, respectively. Referring to FIG. 9(*a*), the partial-display-type cylindroid mobile terminal may include a body 231 which is cylindroid, and a flexible display 233 which partially covers the outer circumferential surface of the body 231. Referring to FIG. 9(*b*), the partial-display-type cylindrical mobile terminal may include a body 235 which is cylindrical, and a flexible display 237 which partially covers the outer circumferential surface of the body 235. The flexible display 233 or 237 may be installed on the body 231 or 235, conforming to the curve of the body 231 or 235.

Figure 10:
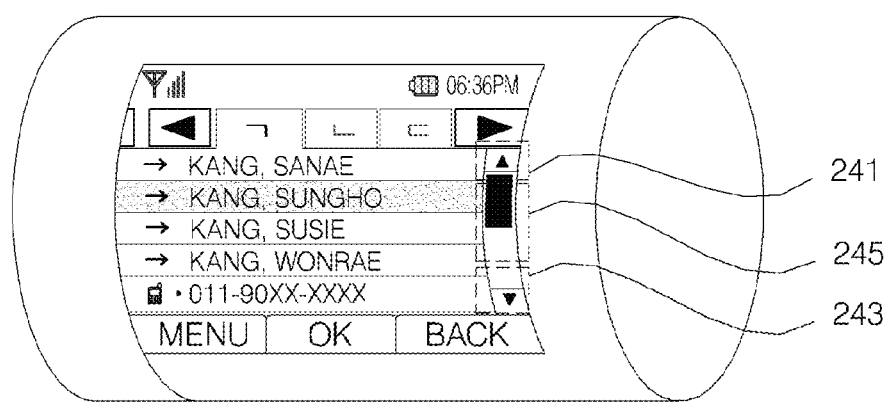

The operation of the partial-display-type cylindroid or cylindrical mobile terminal may be controlled differently from one area to another on the body 231 or 235 according to the slope. For example, referring to FIG. 10, a cursor displayed on the flexible display 237 may be configured to move faster in areas 241 and 243 with a steep slope than in an area with a gentle slope. Similarly, the speed of scrolling may be set to be higher in the areas 241 and 243 than in the area 245.

Figure 11:
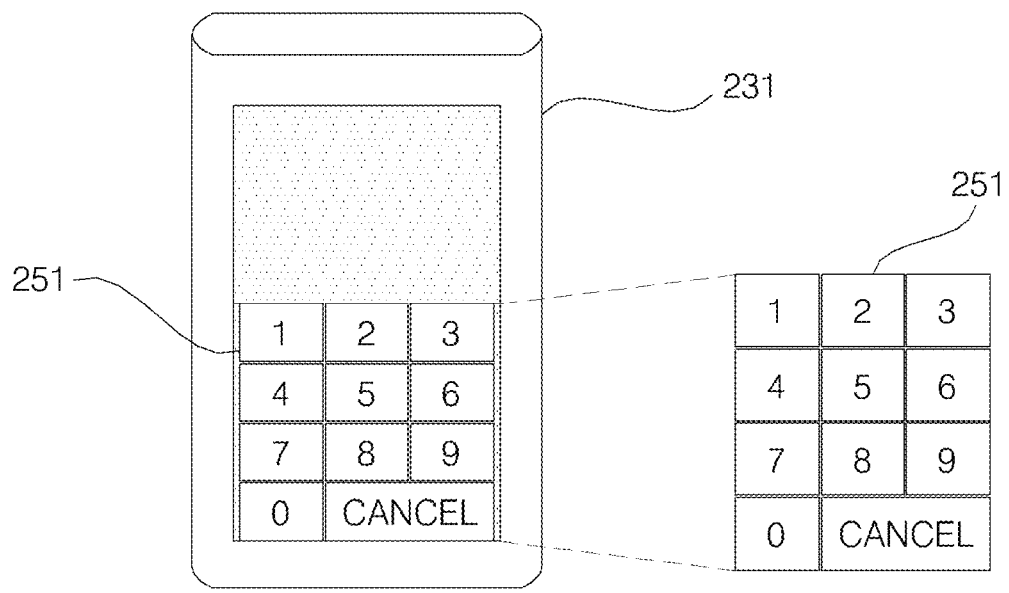
Figure 12:
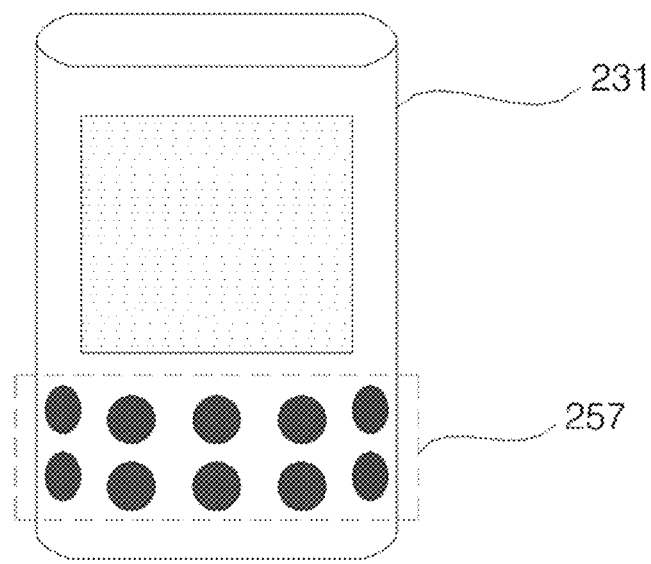

FIGS. 11 and 12 illustrate various input devices for use in the partial-display-type cylindroid mobile terminal shown in FIG. 9(*a*). Referring to FIG. 11, a certain part of the flexible display 233 may be used as a touch keypad input window 251. A certain part of the touch keypad input window 251 may be used as a handwritten input recognition window. Alternatively, referring to FIG. 12, a dome keypad 257 may be installed on the body 231. Still alternatively, a touch sensor or a tactile sensor may be installed on the body 231 and may thus be used as an input device.

Figure 13:
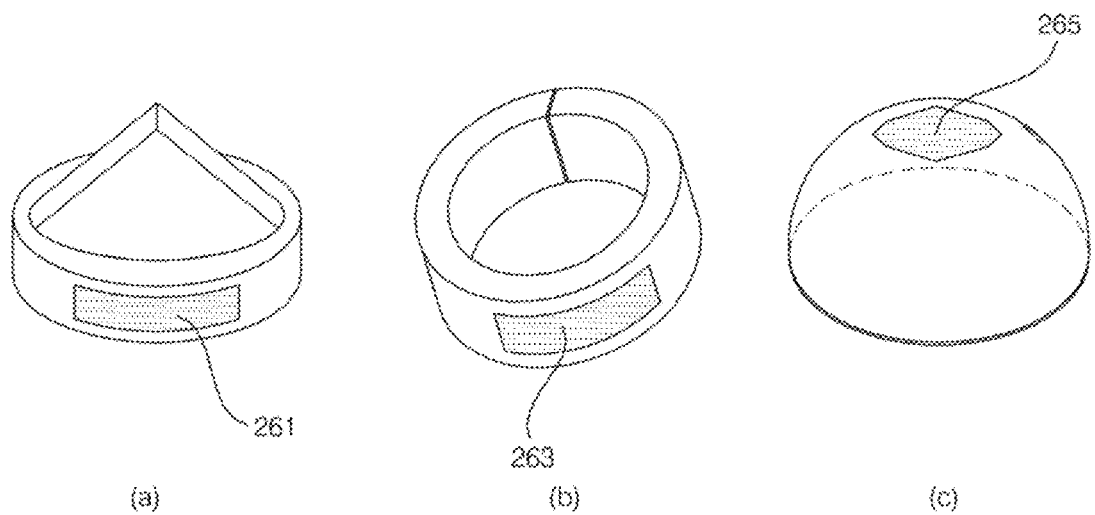

FIGS. 13(*a*) through 13(*c*) illustrate other various types of partial-display-type cylindroid or cylindrical mobile terminals. Referring to 13(*a*) through 13(*c*), a partial-display-type cylindroid or cylindrical mobile terminal may be manufactured in various shapes other than a cylindroid or a cylinder, and a flexible display 261, 263 or 265 may be installed on the outer circumferential surface of the partial-display-type cylindroid or cylindrical mobile terminal.

Figure 14:
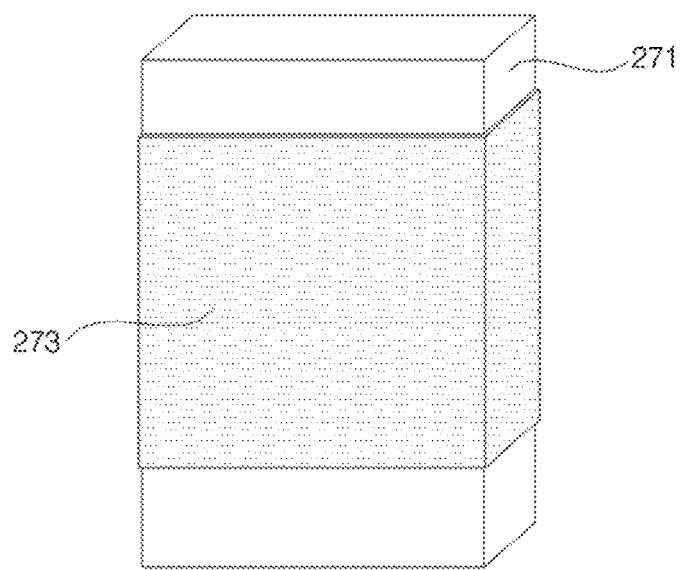
FIGS. 14 through 17 illustrate various types of full-display-type prism-shaped mobile terminals.

FIG. 14 illustrates a full-display-type prism-shaped mobile terminal. Referring to FIG. 14, the full-display-type prism-shaped mobile terminal may include a body 271 which is prism-shaped, and a flexible display 273 which is formed as a band surrounding the body 271 and can thus allow the side surfaces of the body 281 to be used as display regions.

Different operation screens may be displayed on the respective side surfaces of the body 271, and only some of the side surfaces of the body 271 may be used as display regions. The flexible display 273 may be divided into a number of display regions, and different operation screens may be displayed in the respective display regions. Alternatively, the flexible display 273 may be used as a single display, and thus, a single operation screen may be displayed on the entire flexible display 273. By using an acceleration sensor, it is possible to uniformly maintain the direction of display of a screen on a certain part of the flexible display 273 regardless of the rotation of the body 271.

Figure 15:
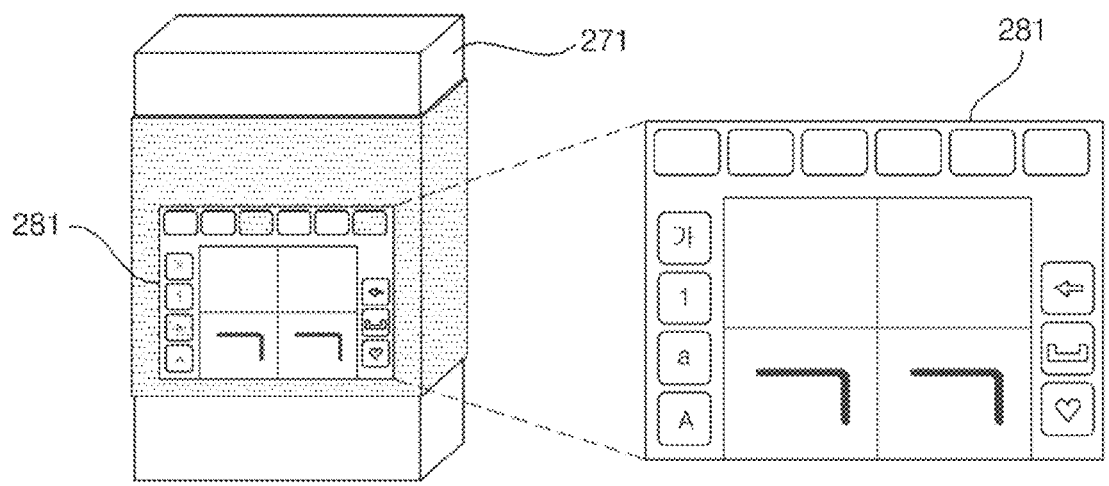
Figure 16:
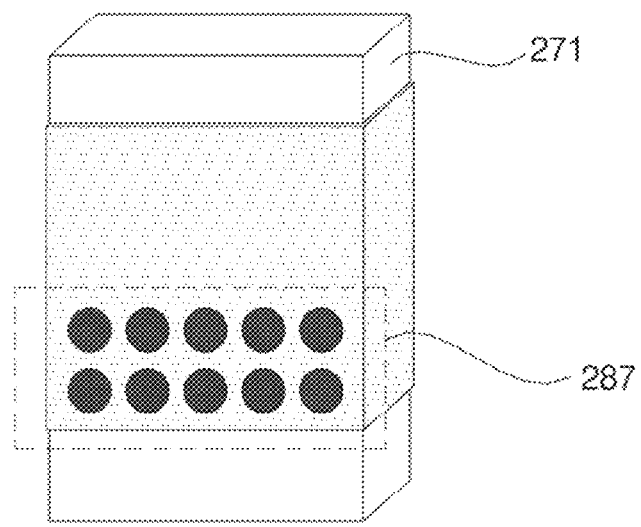

FIGS. 15 and 16 illustrate various input devices for use in the full-display-type prism-shaped mobile terminal shown in FIG. 14. Referring to FIG. 15, a certain part of the flexible display 273 may be used as a touch keypad input window 281. A certain part of the touch keypad input window 281 may be used as a handwritten input recognition window. Alternatively, referring to FIG. 16, a dome keypad 287 may be installed on the body 271. Still alternatively, a touch sensor or a tactile sensor may be installed on the body 271 and may thus be used as an input device.

Figure 17:
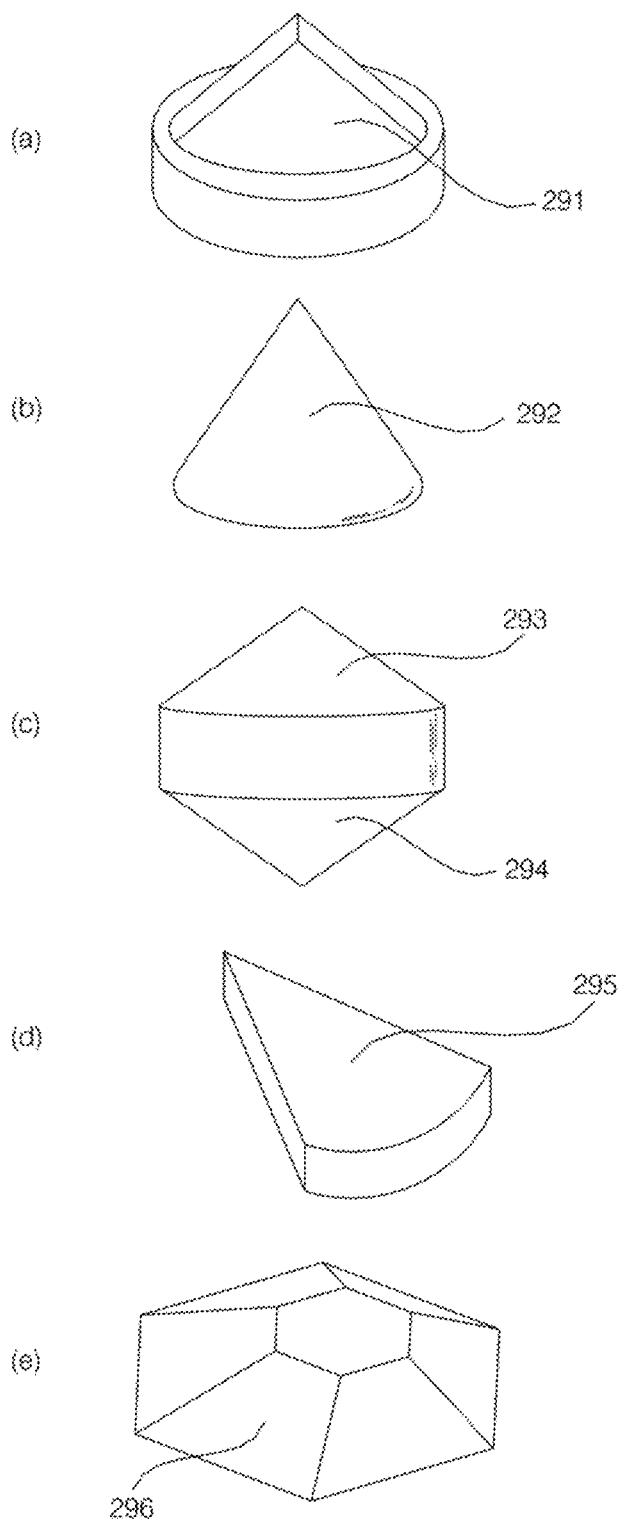

FIG. 17(*a*) through 17(*e*) illustrates other various types of full-display-type prism-shaped mobile terminals. Referring to FIG. 17(*a*) through 17(*e*), a full-display-type prism-shaped mobile terminal may be manufactured in various shapes other than a cylindroid or a cylinder, and a flexible display 291, 292, 293, 294, 295 or 296 may be installed along the outer circumferential surface of the full-display-type prism-shaped mobile terminal.

Figure 18:
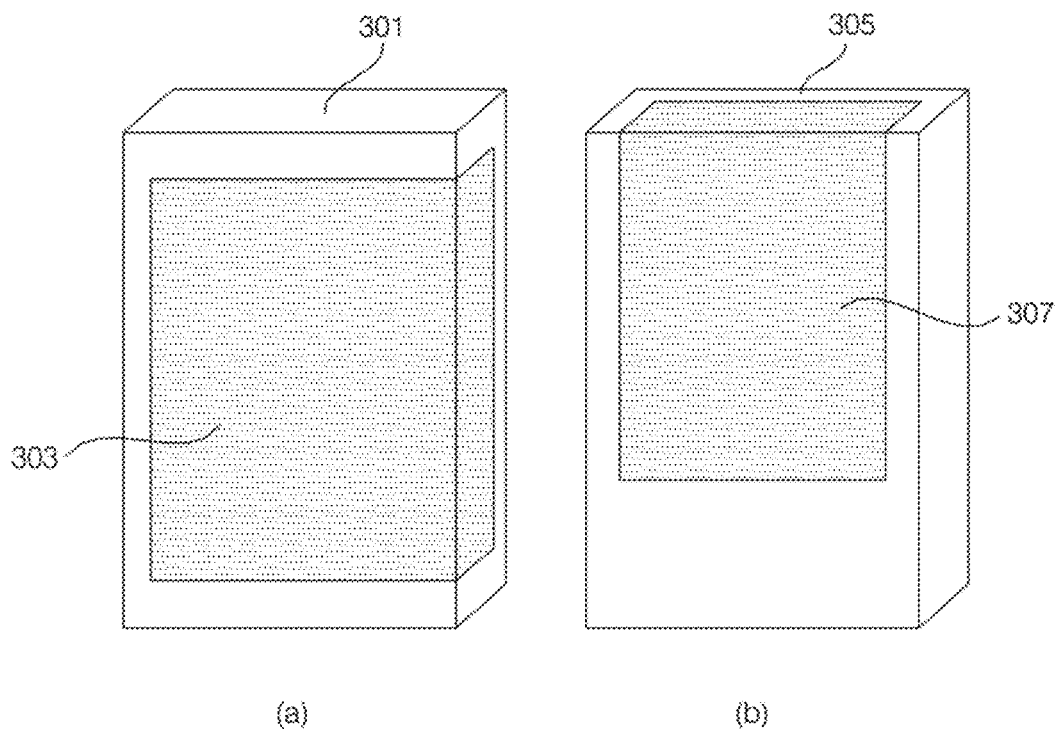
FIGS. 18 through 20 illustrate various types of full-display-type prism-shaped mobile terminals.

FIGS. 18(a) and 18(b) illustrate examples of a partial-display-type prism-shaped mobile terminal. Referring to FIGS. 18(a) and 18(b), a flexible display 303 or 307 may be installed, covering only some of the surfaces of a body 301 or 305 which is prism-shaped.

Figure 19:
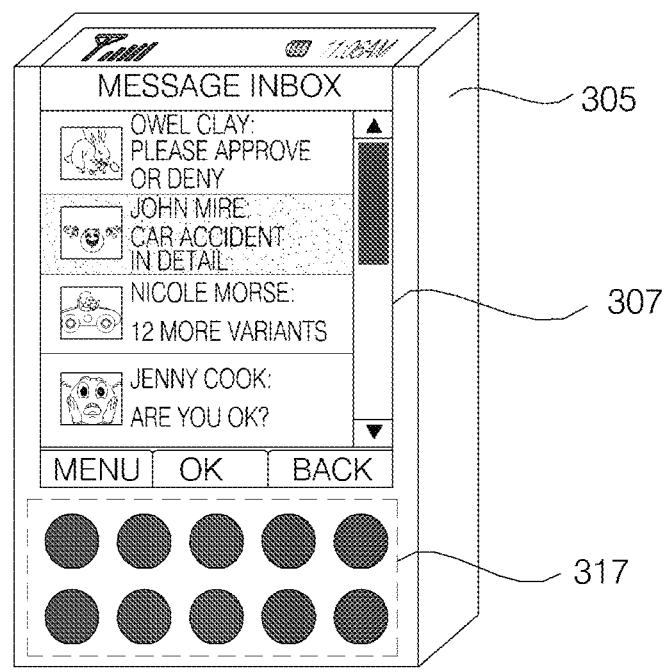
Figure 20:
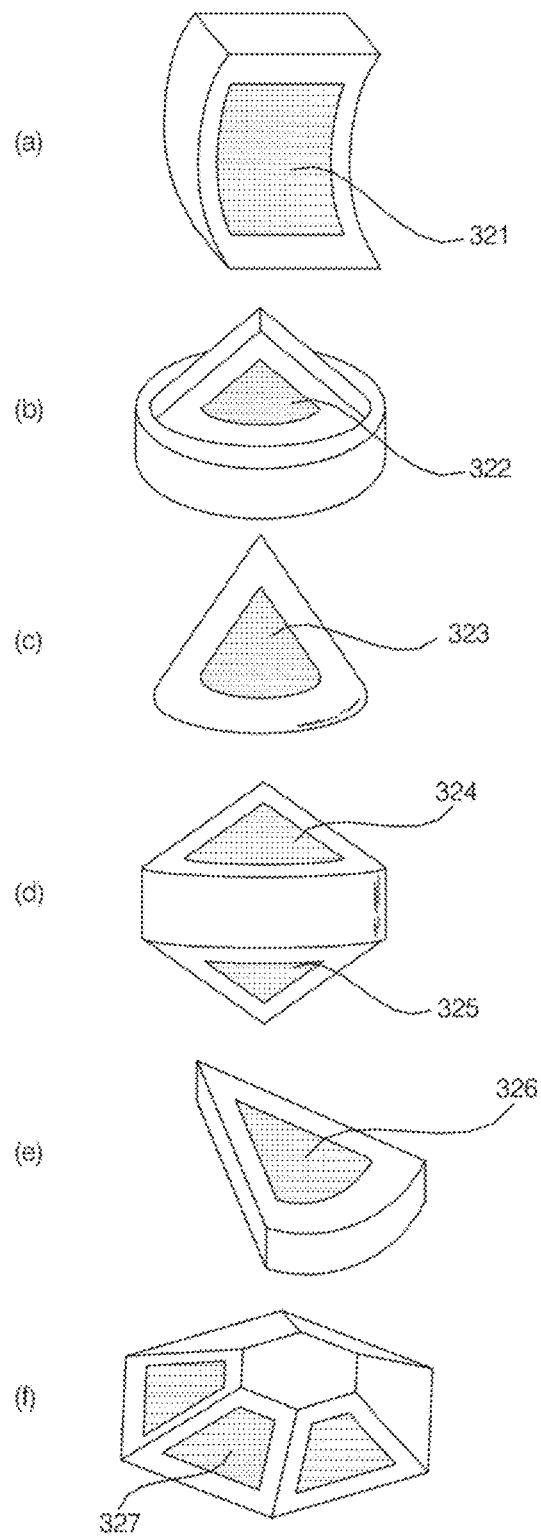

FIG. 19 illustrates an input device for use in the partial-display-type prism-shaped mobile terminal shown in FIG. 18(b). Referring to FIG. 19, a certain part of the flexible display 307 may be used as a touch keypad input window. A certain part of the touch keypad input window may be used as a handwritten input recognition window. Alternatively, a dome keypad 317 may be installed on the body 305. Still alternatively, a touch sensor or a tactile sensor may be installed on the body 305 and may thus be used as an input device.

FIGS. 20(a) through 20(f) illustrate other various types of partial-display-type prism-shaped mobile terminals. Referring to FIGS. 20(a) through 20(f), a partial-display-type prism-shaped mobile terminal may be manufactured in various shapes, and a flexible display 321, 322, 323, 324, 325, 326, or 327 may be installed on one or more surfaces of the partial-display-type prism shaped mobile terminal.

Figure 21:
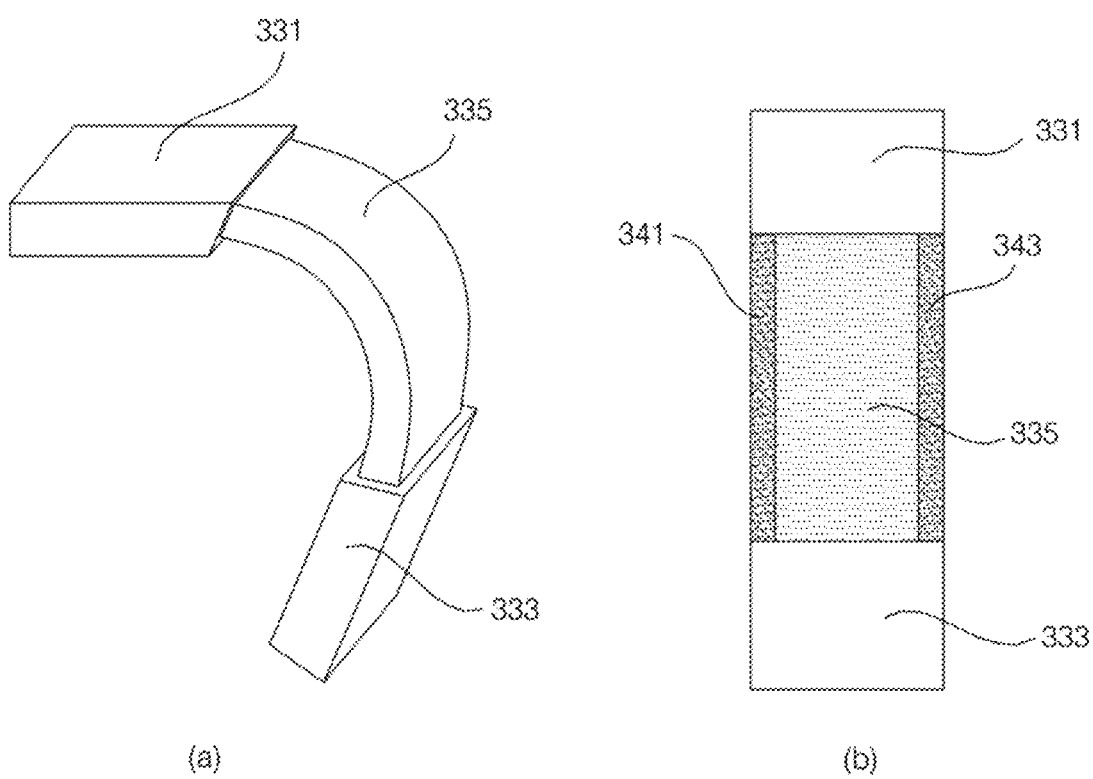
FIG. 21 illustrates a freestyle mobile terminal.

FIG. 21 illustrates a freestyle mobile terminal. Referring to FIG. 21, the freestyle mobile terminal may include a first body 331, a second body 333, and a flexible display 335 connecting the first and second bodies 331 and 333.

The flexible display 335 may be bent or folded. The flexible display 335 may include supporting elements 341 and 343, which help the flexible display 335 maintain its shape even after being bent or folded. Thus, the user can freely change the shape of the flexible display 335. For example, the user can bend the flexible display 335 into the shape of a bracelet and can wear the flexible display 335 on the left or right wrist.

In short, it is possible to control various operations performed by the freestyle mobile terminal by bending or folding the flexible display 335 and then maintaining the shape of the flexible display 335 using the supporting elements 341 and 343.

Alternatively, the flexible display 335 may return to its original shape after being bent or folded, if the supporting elements 341 and 343 are flexible enough to return to their original shape after being bent or folded. In this case, when the flexible display 353 returns to its original shape after being bent or folded, a haptic effect such as vibration may be generated in order to alert the user.

Various types of folder-type mobile terminals will hereinafter be described in detail.

Figure 22:
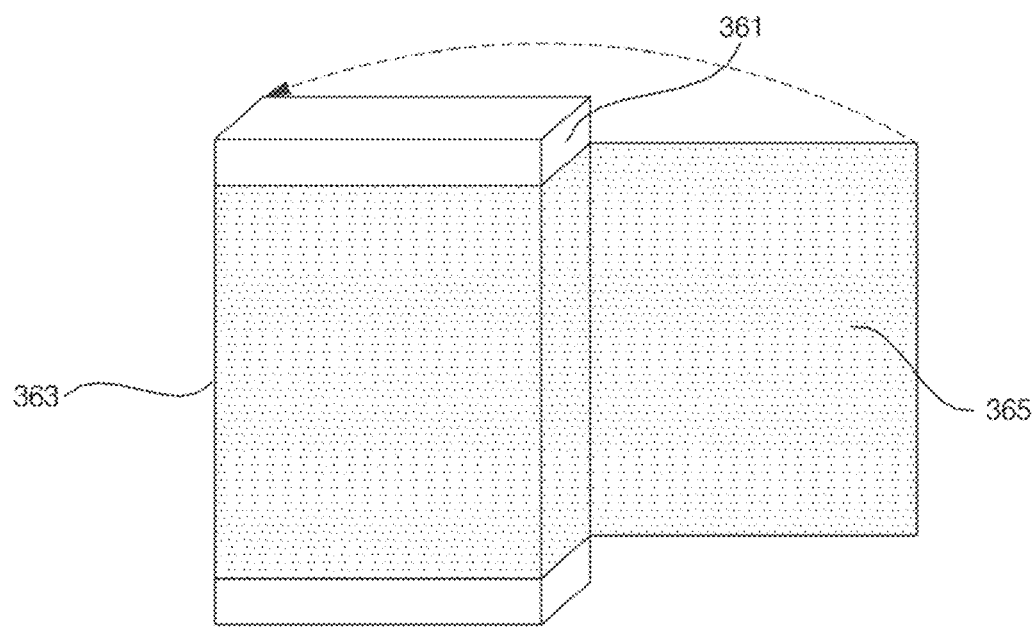
FIGS. 22 through 27 illustrate various types of folding mobile terminals.
Figure 23:
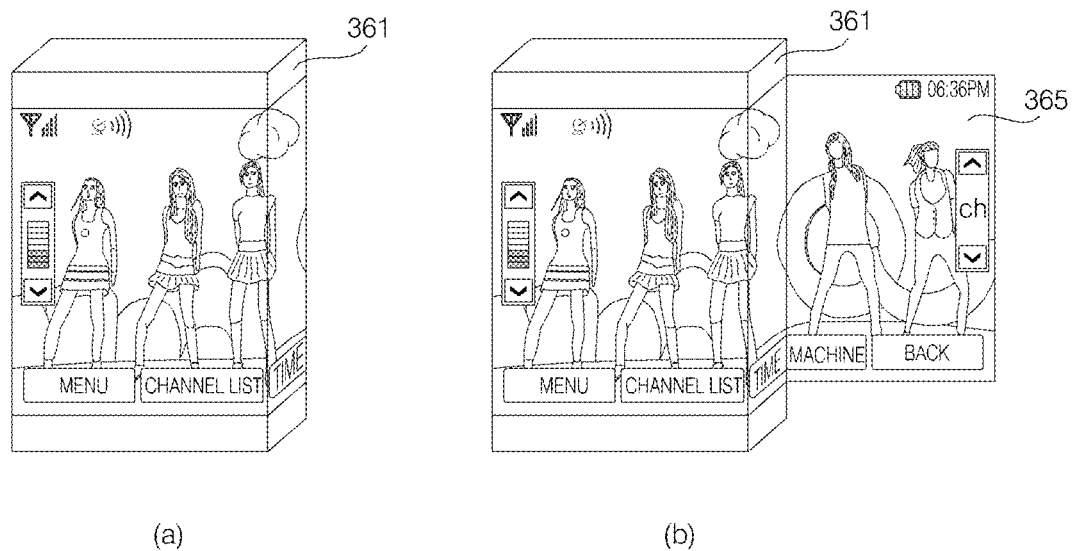

FIG. 22 illustrates an outwardly-folding mobile terminal, which is a type of folder-type mobile terminal. Referring to FIG. 22, the outwardly-folding mobile terminal may include a body 361 which is rectangular-prism-shaped, a flexible display 363 which is attached onto the body 361 and covers two or more side surfaces of the body 361, and a flexible display extension 365 which extends from the flexible display 363 and is folded over the rear side surface of the body 361. The flexible display extension 365 may expand the display region of the outwardly-folding mobile terminal by being unfolded, as shown in FIG. 23.

The flexible display extension 365 may be used for various application operations. When the flexible display extension 365 is unfolded, a certain function or menu may be automatically executed. On the other hand, when the flexible display extension 365 is folded on the rear side surface of the body 361, the outwardly-folding mobile terminal may return to the state before the unfolding of the flexible display extension 365. For example, if the flexible display extension 365 is unfolded when the outwardly-folding mobile terminal is placed in a screen-lock state, a password window may automatically pop up. Then, if the flexible display extension 365 is folded back on the rear side surface of the body 361, the password window may be closed. Alternatively, if the flexible display extension 365 is unfolded when the outwardly-folding mobile terminal is placed in the screen-lock state, the outwardly-folding mobile terminal may be automatically released from the screen-lock state. Then, if the flexible display extension 365 is folded back on the body 361, the outwardly-folding mobile terminal may be placed back in the screen-lock state.

By using the flexible display 363 and the flexible display extension 365, it is possible to display a dual navigation screen, a navigation screen and a DMB screen, a dual electronic book (e-book) screen, a photo-editing screen and a screen for displaying original photos, a navigation screen and a browser screen, and a dual webpage screen.

Figure 24:
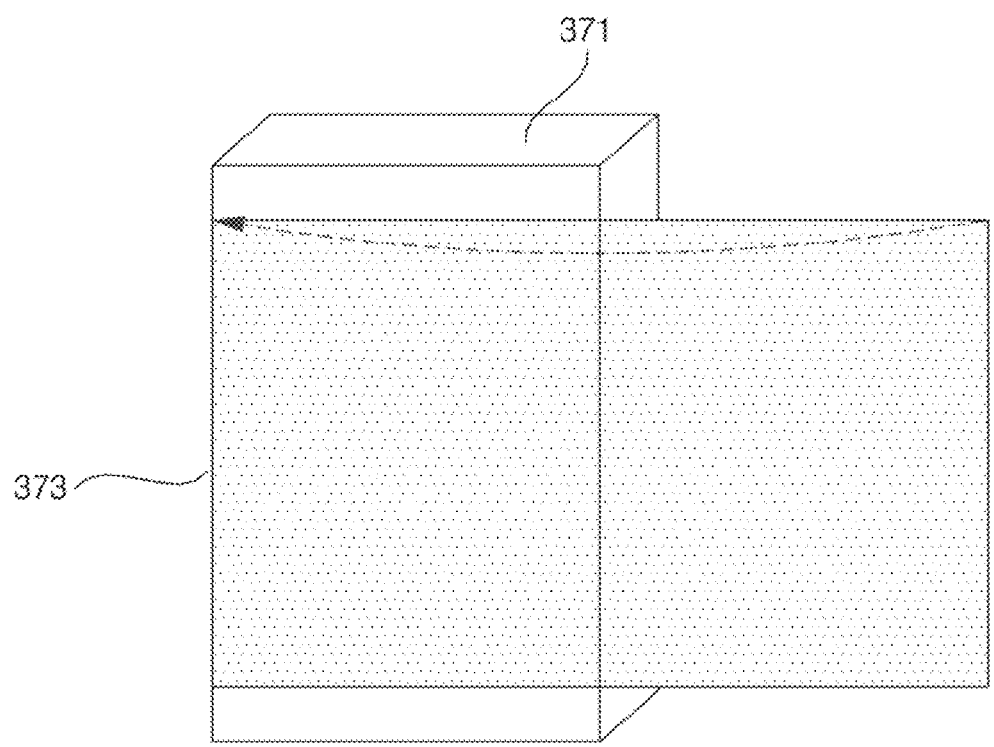

FIG. 24 illustrates an inwardly-folding mobile terminal, which is another type of folder-type mobile terminal. Referring to FIG. 24, the inwardly-folding mobile terminal may include a body 371 which is rectangular prism-shaped, and a flexible display 373 which covers one side surface of the body 371 and can be folded on itself. Since the flexible display 373 is flexible enough to be folded inwards, it is possible to expand the display region of the inwardly-folding mobile terminal simply by unfolding the flexible display 373.

When the flexible display 373 is folded inwards on the body 371, no screen may be displayed on the flexible display 373. If the flexible display 373 is a transparent flexible display, the flexible display 373 may be able to display a screen even when folded inwards on the body 371. The flexible display 373 may be configured to cover the body 371 only partially, and may thus be used as a sub-display. A screen mode or a screen displayed on the flexible display 373 may vary according to whether the flexible display 373 is folded or unfolded.

Figure 25:
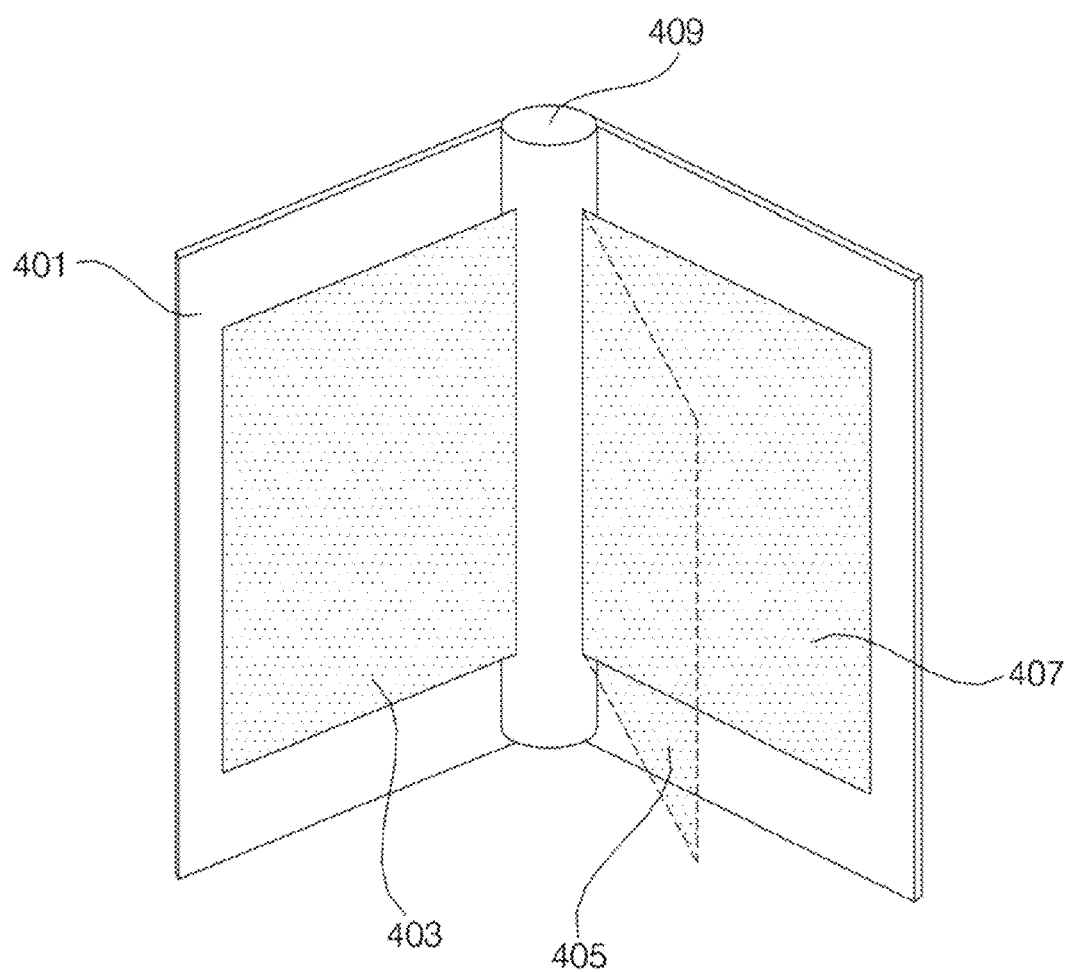

FIG. 25 illustrates a flexible display-embedded mobile terminal, which is another type of folder-type mobile terminal. Referring to FIG. 25, the flexible display-embedded mobile terminal may include a body 401 which is folder-shaped, a first display module 403 and second and third display modules 405 and 407 which are flexible displays and are bound in the folder-shaped body 401. An LCD may be used as the first display module 403. The first display module 403 may be used as a main display, and the second and third display modules 405 and 407, which are bound to a hinge 409, may be used as sub-displays. Thus, it is possible to expand the display region of the flexible display-embedded mobile terminal and provide a dual display. In addition, it is possible to control various operations performed by the flexible display-embedded mobile terminal by using the flexibility of the second and third display modules 405 and 407. Moreover, it is possible to use the second and third display modules 405 and 407 as input devices.

For example, a main screen may be displayed on the first display module 403, and a popup screen, an option menu screen, a popup feedback screen, and/or a drop box screen may be displayed on the second and third display modules 405 and 407. Alternatively, a predetermined screen may be displayed on the first display module 403, and a detailed information screen showing information regarding the predetermined screen may be displayed on the second and third display modules 405 and 407. Still alternatively, a list of items or icons may be displayed on the first display module 405, and an item or icon selected from the list displayed on the first display module 405 may be displayed on the second and third display modules 405 and 407. Still alternatively, a predetermined list may be displayed on the first display module 403, and a screen showing the result of performing a submenu on the predetermined list may be displayed on the second and third display modules 405 and 407.

Still alternatively, an idle screen may be displayed on the first display module 403, and hot key icons, objects and shortcut menus may be displayed on the second and third display modules 405 and 407. Still alternatively, an operation screen corresponding to a menu selected by the user may be displayed on the first display module 403, and various information regarding the operation screen such as tabs, settings icons, indicator icons, soft menus, mini-maps, map information, geographic information, a preview screen and progress state information may be displayed on the second and third display modules 405 and 407. Still alternatively, an input screen may be displayed on the first display module 403, and an input window may be displayed on the second and third display modules 405 and 407.

The second and third display modules 405 and 407 may be configured to display different screens.

Figure 26:
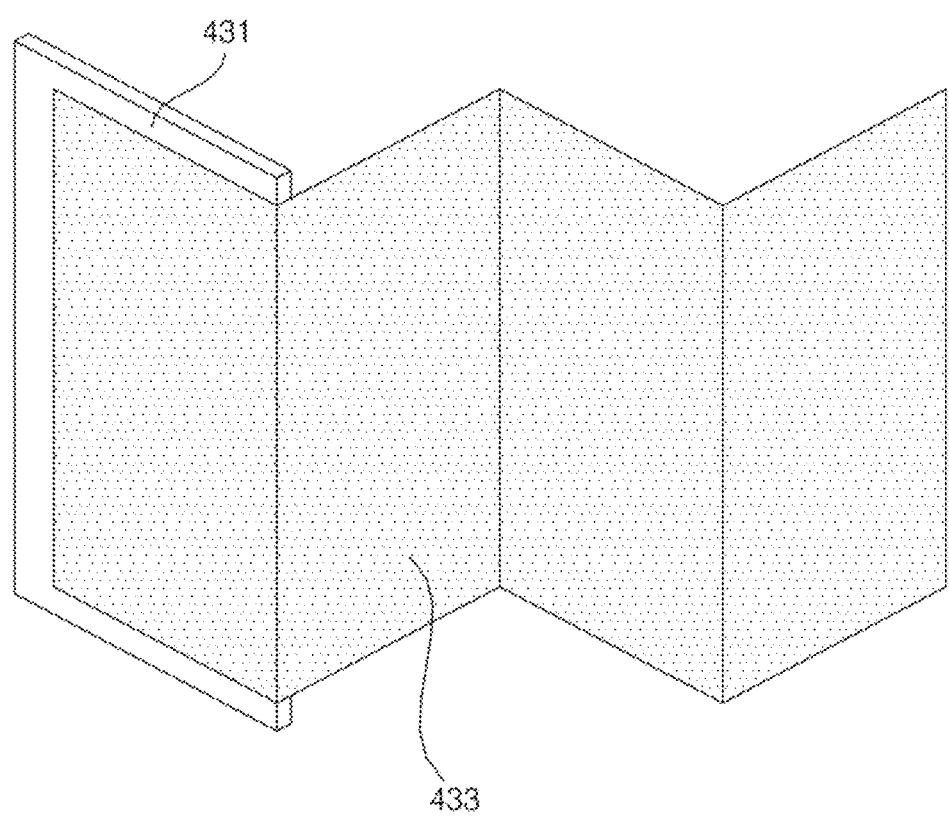
Figure 27:
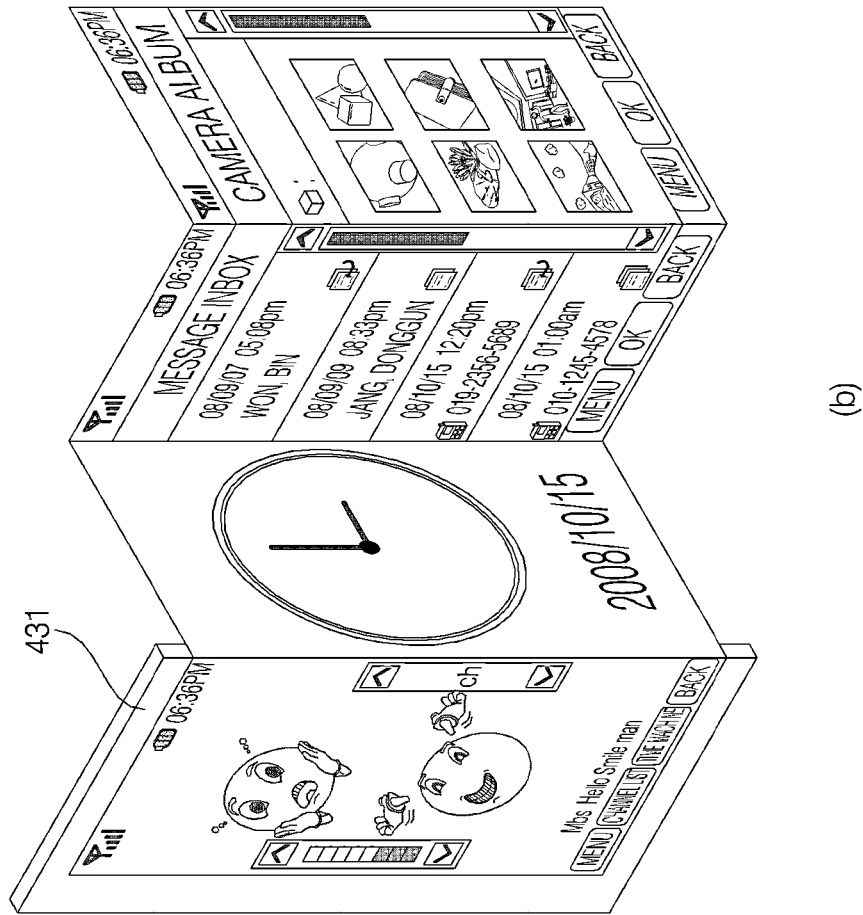
Figure 27:
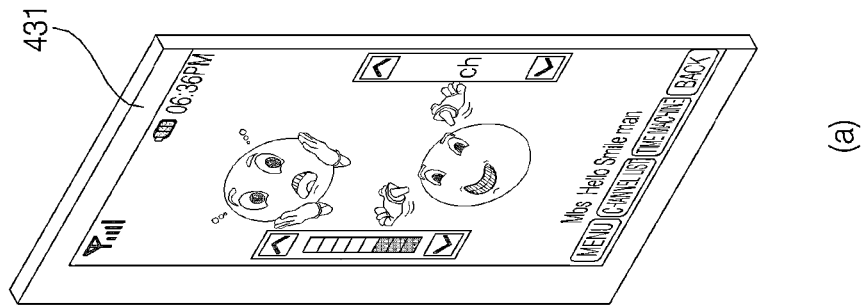

FIGS. 26, 27(*a*) and 27(*b*) illustrate a folding screen-type mobile terminal. Referring to FIG. 26, the folding screen-type mobile terminal may include a body 431 and a flexible display 433 which is fixed onto the body 431 and is folded back and forth on itself so as to have a plurality of folds. Each of the folds of the flexible display 433 may display the same operation screen, as shown in FIG. 27(*a*). Alternatively, different operation screens may be displayed on the respective folds of the flexible display 433, as shown in FIG. 27(*b*).

When the flexible display 433 is folded, different operation screens may be displayed on the respective folds of the flexible display 433. On the other hand, when the flexible display 433 is completely unfolded, one of the operation screens may be displayed on the entire flexible display 433. The user may view each of the different operation screens by slightly opening the flexible display 433. If the user touches one of the folds of the flexible display 433 and then unfolds the flexible display 433, the operation screen displayed on the touched fold may be displayed on the entire flexible display 433.

Figure 28:
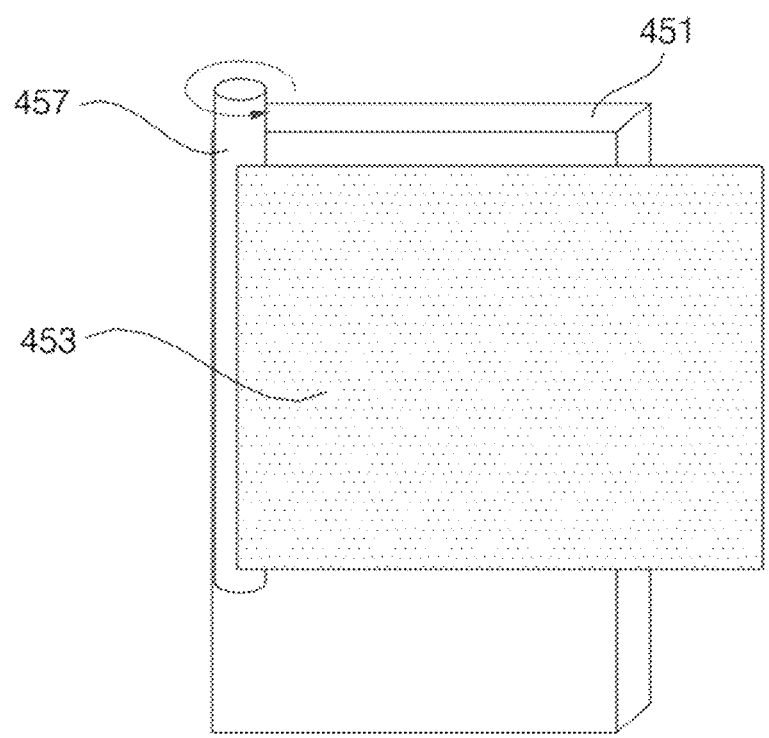
FIGS. 28 through 33 illustrate various types of rolling mobile terminals.
Figure 29:
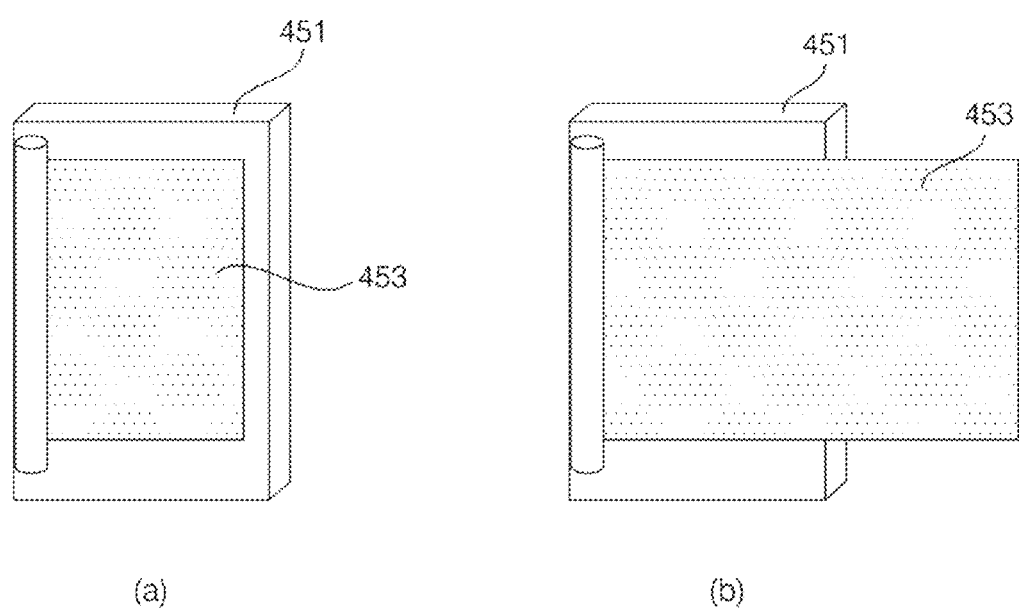

FIGS. 28, 29(*a*) and 29(*b*) illustrate an outwardly-rolling mobile terminal, which is a type of rolling mobile terminal. Referring to FIG. 28, the outwardly-rolling mobile terminal may include a body 451, a roller 457 and a flexible display 453 which can be rolled up on and unrolled from the roller 457.

Referring to FIG. 29, the flexible display 453 may initially be rolled up on the roller 457 and may thus be exposed only partially. The flexible display 453 may be unrolled from the roller 457 by being pulled. The operation of the outwardly-rolling mobile terminal may be effectively controlled while expanding or reducing the display region of the outwardly-rolling mobile terminal according to whether the flexible display 453 is rolled up or unrolled.

The operation of the outwardly-rolling mobile terminal may be controlled according to the degree to which the flexible display 453 is unrolled from the roller 457. When one corner of the flexible display 453 is bent, detailed information regarding an operation currently being performed by the outwardly-rolling mobile terminal may be displayed on the flexible display 453.

Figure 30:
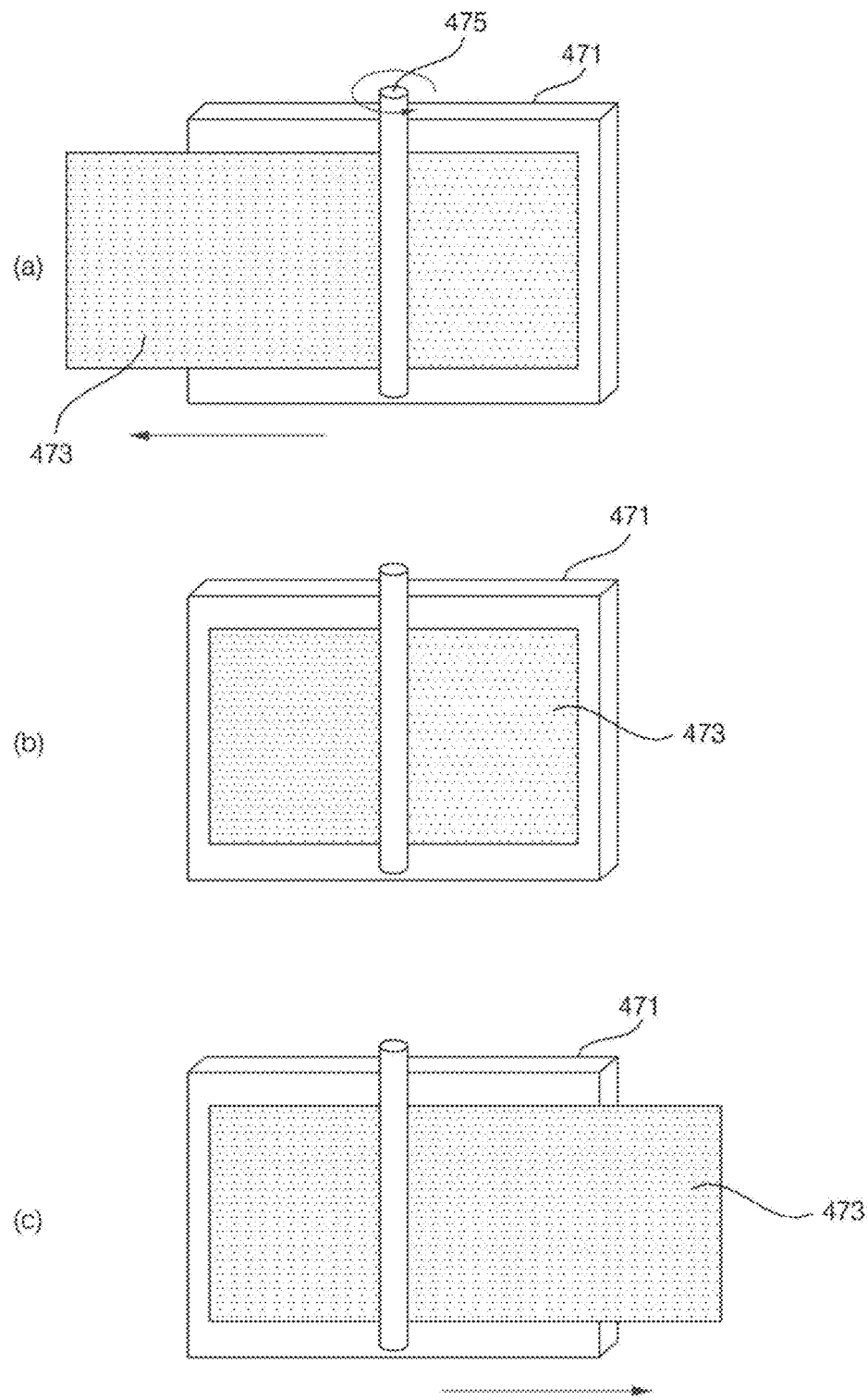

FIGS. 30(*a*) through 30(*c*) illustrate a both-side rolling mobile terminal, which is another type of rolling mobile terminal. Referring to FIGS. 30(*a*) through 30(*c*), the both-side rolling mobile terminal may include a body 471, a roller 475 and a flexible display 473 which can be rolled up on and unrolled from the roller 475 in two opposite directions. The roller 475 may be disposed in the middle of the flexible display 473. The left, right or both sides of the flexible display 475 may be unrolled from the roller 475, thereby expanding the display region of the both-side rolling mobile terminal. Different operation screens may be displayed on the left and right sides of the flexible display 475, or a single operation screen may be displayed on the entire flexible display 475. The left and right sides of the flexible display 475 may be selectively unrolled from the roller 475. If one of the left and right sides of the flexible display 475 is unrolled from the roller 475 when different operation screens are displayed on the left and right sides of the flexible display 475, the operation screen displayed on the unrolled side of the flexible display 475 may be displayed on the entire flexible display 473.

One of the left and right sides of the flexible display 475 may be used as a main display and may thus display a main operation screen, and the other side of the flexible display 475 may be used as a sub-display and may thus display, for example, a popup screen.

Figure 31:
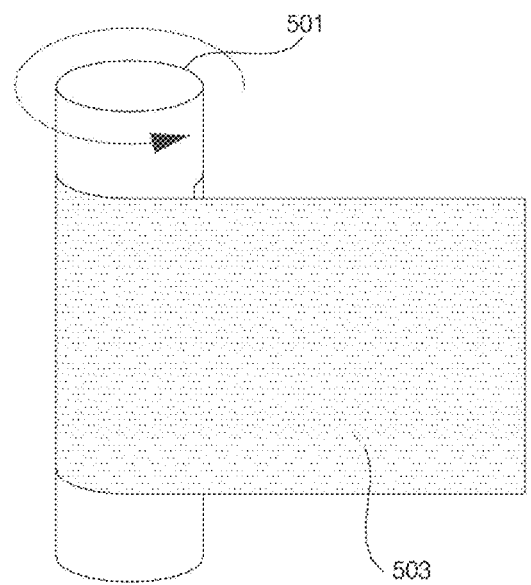

FIG. 31 illustrates a scroll-type mobile terminal, which is another type of rolling mobile terminal. Referring to FIG. 31, the scroll-type mobile terminal may include a body 501, which is formed as a cylinder or a prism, and a flexible display 503 which is rolled into a scroll on the body 501. The outer surface of the scroll of the flexible display 503 may be used as a display until the flexible display 503 is unrolled. The display region of the scroll-type mobile terminal may be expanded by unrolling the flexible display 503.

The flexible display 503 may be divided into a plurality of regions. Then, different pieces of information may be displayed in the respective regions in order of importance, or different operation screens may be displayed in the respective regions.

Alternatively, the flexible display 503 may be divided into a plurality of regions, and main objects and sub-objects may be displayed in the regions according to the degree to which the flexible display 503 is unrolled. Thereafter, if the flexible display 503 is rolled up again, the operation screen displayed before the unrolling of the flexible display 503 may be displayed again on the flexible display 503.

Figure 32:
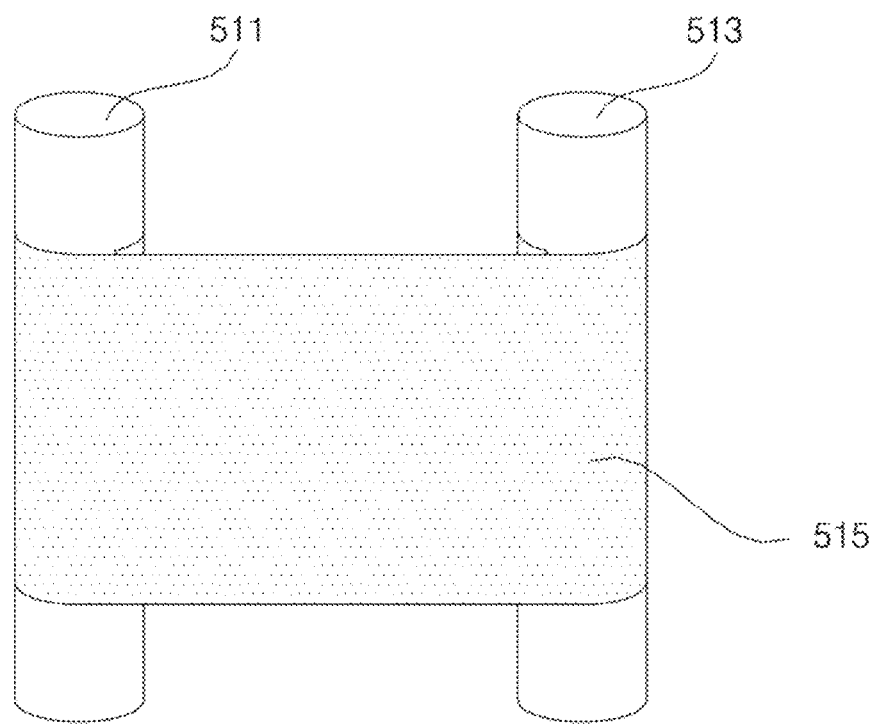
Figure 33:
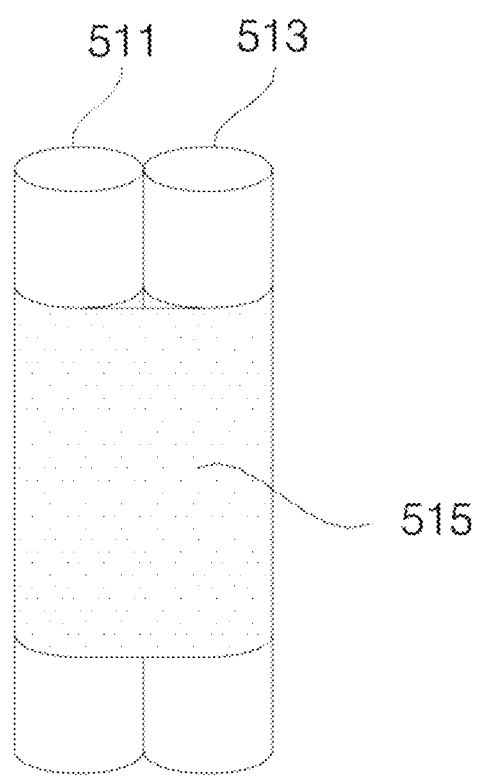

FIGS. 32 and 33 illustrate a double-scroll-type mobile terminal. Referring to FIG. 32, the double-scroll-type mobile terminal may include first and second bodies 511 and 513, which are formed as cylinders or prisms, and a flexible display 515 which connects the first and second bodies 511 and 513 and can be rolled up on or unrolled from the first and second bodies 511 and 513. The amount by which the flexible display 515 is rolled on the first body 511 may be the same as or different from the amount by which the flexible display 515 is rolled on the second body 513.

Referring to FIG. 33, if the flexible display 515 is unrolled when a screen is displayed on part of the flexible display 515, the screen may be scaled up accordingly. If the amount by which the flexible display 515 is rolled on the first body 511 is greater than the amount by which the flexible display 515 is rolled on the second body 513, a left part of the flexible display 515 may be used as an extension of a main screen, and a right part of the flexible display may be used as an extension of a sub-screen.

The flexible display 515 may be divided into a plurality of regions. Then, different pieces of information may be displayed in the respective regions in order of importance, or different operation screens may be automatically displayed in the respective regions.

The double-scroll-type mobile terminal may be switched from one operating mode to another operating mode according to whether the left or right side of the flexible display 515 is unrolled. For example, if the left side of the flexible display 515 is unrolled, the double-scroll-type mobile terminal may be placed in an ordinary-call mode. On the other hand, if the right side of the flexible display 515 is unrolled, the double-scroll-type mobile terminal may be placed in a multimedia mode.

Figure 34:
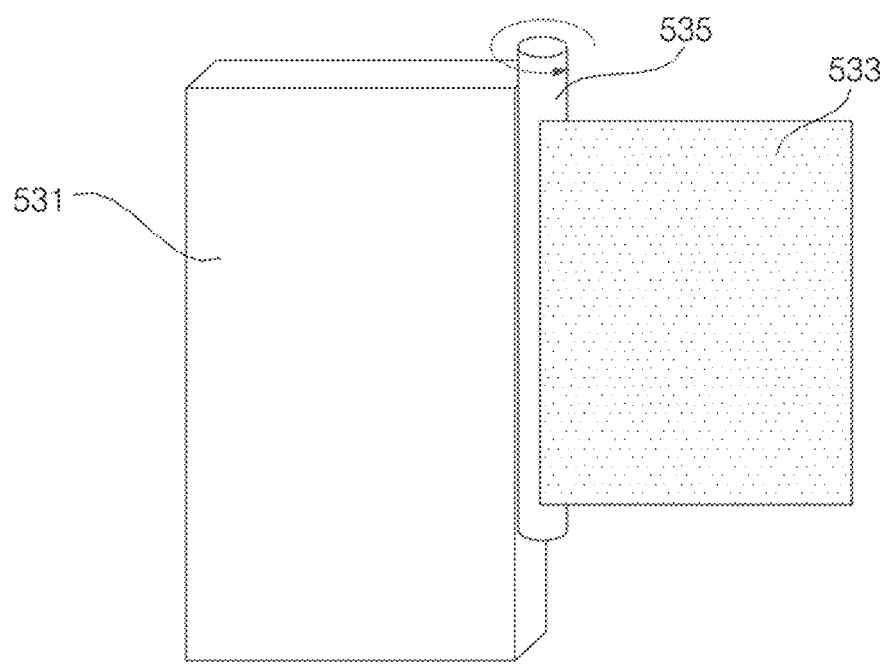
FIGS. 34 and 35 illustrate various types of hybrid mobile terminals.
Figure 35:
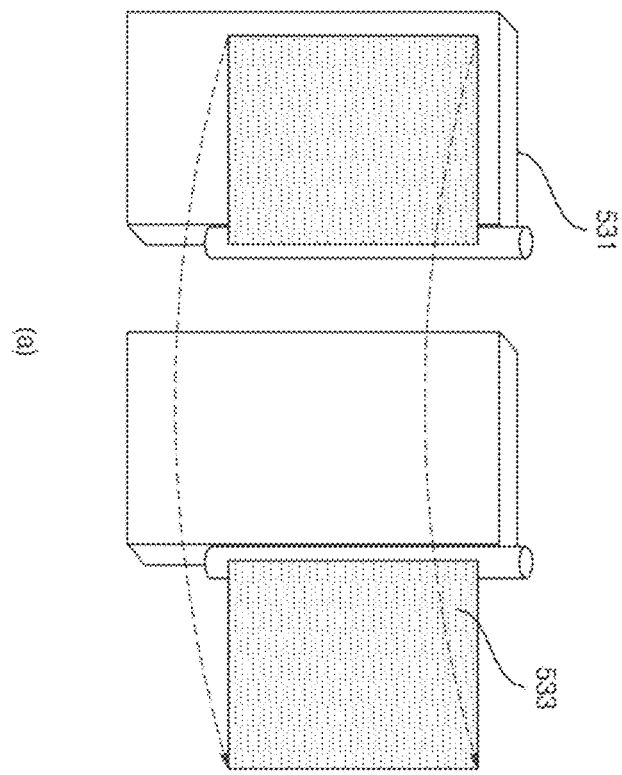
Figure 35:
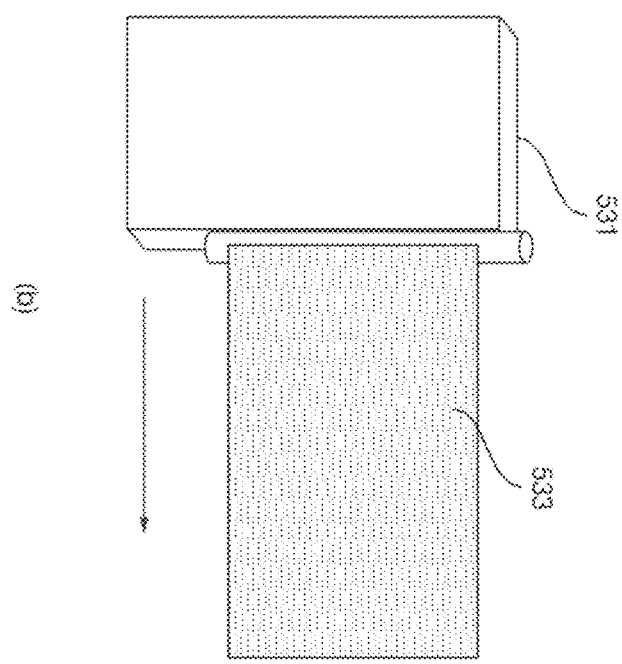

FIGS. 34, 35(*a*) and 35(*b*) illustrate a hybrid mobile terminal. Referring to FIG. 34, the hybrid mobile terminal, which is a combination of a folding mobile terminal and a rolling mobile terminal, may include a body 531 and a flexible display 533 which can be folded over the body 531 and can be rolled up on a roller 535, and may thus be able to address the problems of a mobile terminal having a flexible display into the body thereof.

Referring to FIGS. 35(*a*) and 35(*b*), the flexible display 533 can be folded over the body 531 or can be rolled up on or unrolled from the roller 535. The flexible display 533 may be completely rolled up on the roller 535 and may thus be hidden. When the flexible display 533 is incompletely rolled, the flexible display 533 can be folded over the body 531 and may thus be exposed. The display region of the hybrid mobile terminal may be expanded by unrolling the flexible display 533. In this manner, the hybrid mobile terminal can offer the benefits of both a folding mobile terminal and a rolling mobile terminal.

Figure 36:
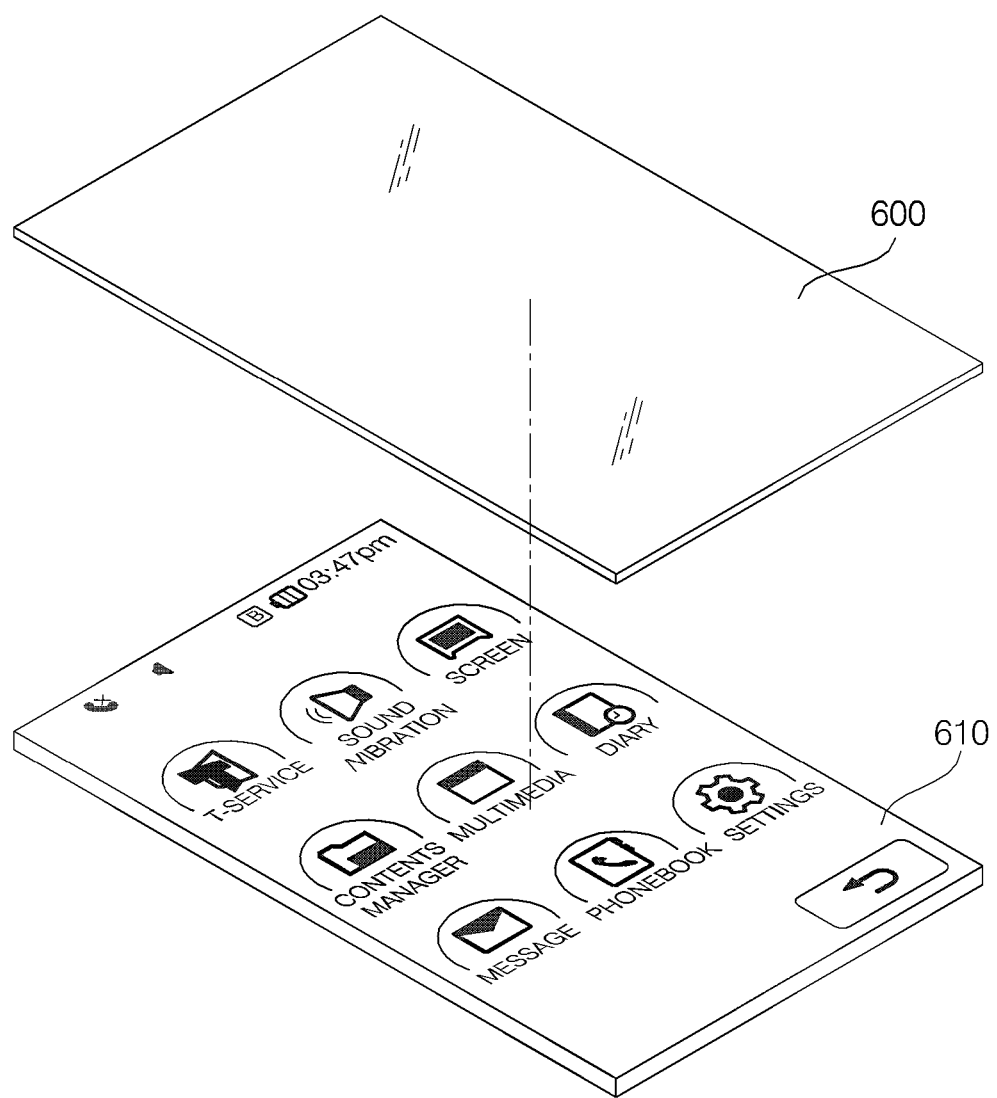
FIGS. 36 through 41 illustrate how to correct a set of touch parameters.
Figure 37:
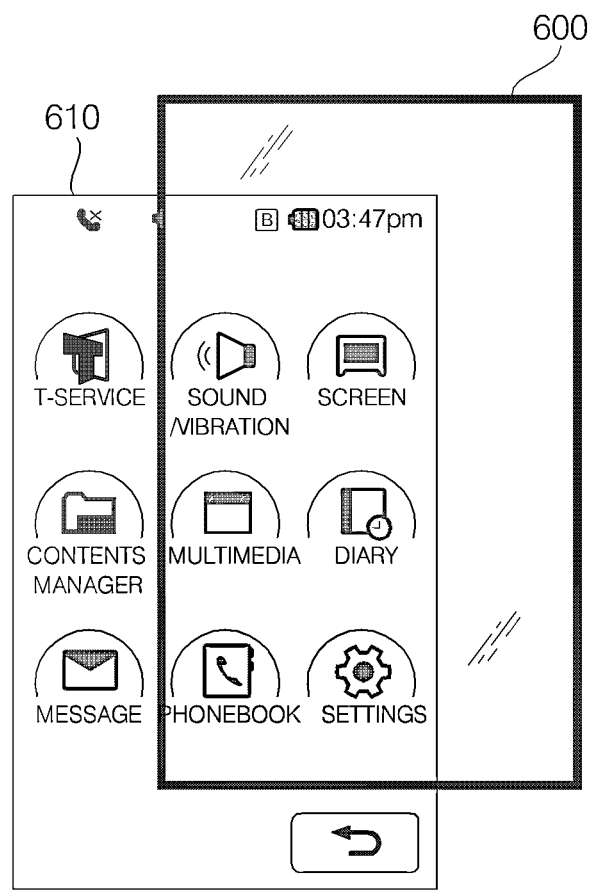
Figure 38:
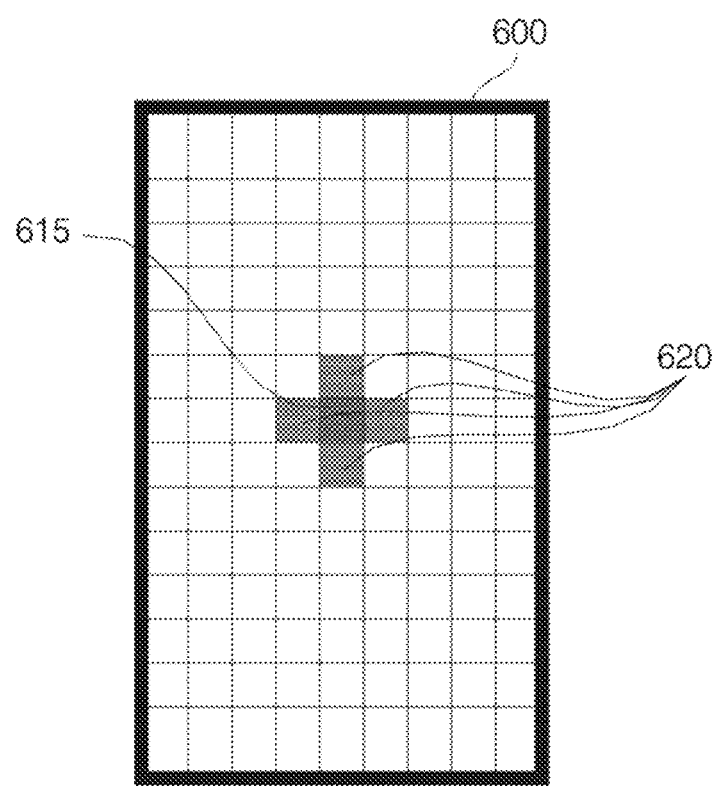

FIGS. 36 through 41 illustrate diagrams for explaining how to correct a set of touch parameters according to the degree to which a flexible display is bent or folded. Referring to FIGS. 36 and 37, a flexible display 610 may be attached to the rear of a touch screen 600, thereby realizing a flexible display module capable of processing a touch input. In this case, the flexible display module may be able to determine the coordinates of a touched point 615 on the touch screen 600 and the coordinates of each point 620 neighboring the touched point 615 based on variations in the pressure at and near the touched point 615.

When the flexible display module is bent or folded, the touch sensitivity of the flexible display module and the coordinates of the touched point 615 may change. Thus, there is need to compensate for such changes, i.e., correct a set of touch parameters including the location of the touched point 615 and the pressure at or near the touched point 615.

Figure 39:
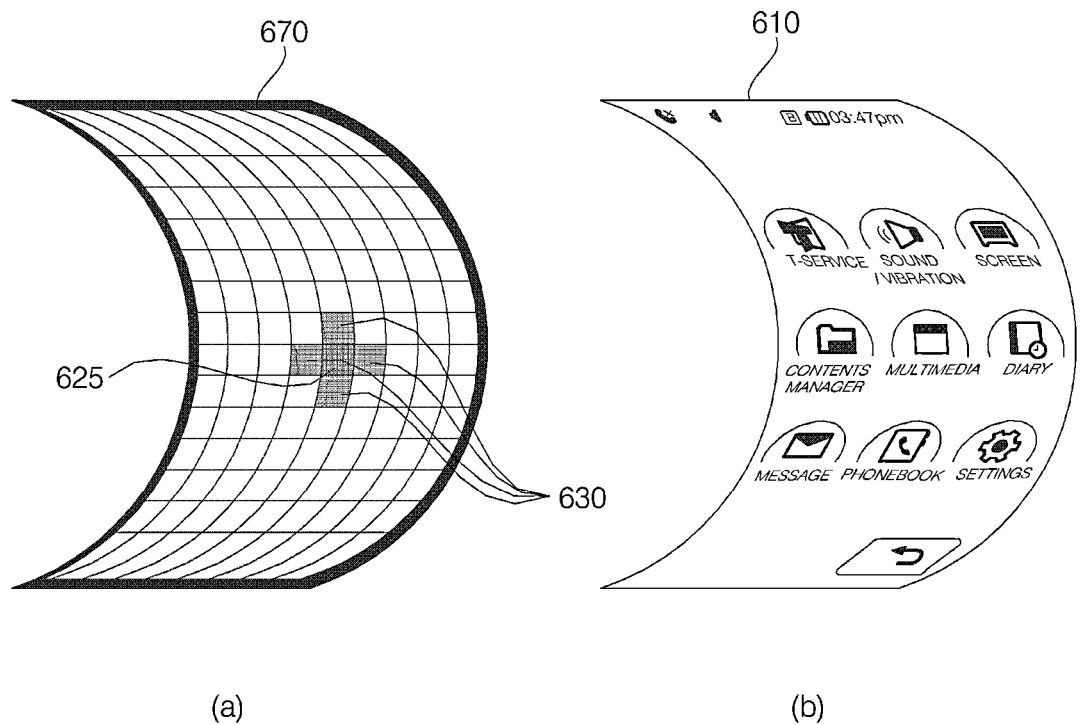

For example, FIGS. 39(*a*) and 39(*b*), if the flexible display module is bent horizontally so that a central part of the flexible display module can be recessed, the touch sensitivity at or near the upper and lower ends of the flexible display module may increase, whereas the touch sensitivity at or near the left and right ends of the flexible display module almost does not change. In this case, it is necessary to correct the touch parameters and thus to reduce the touch sensitivity at or near the left and right ends of the flexible display module.

Figure 40:
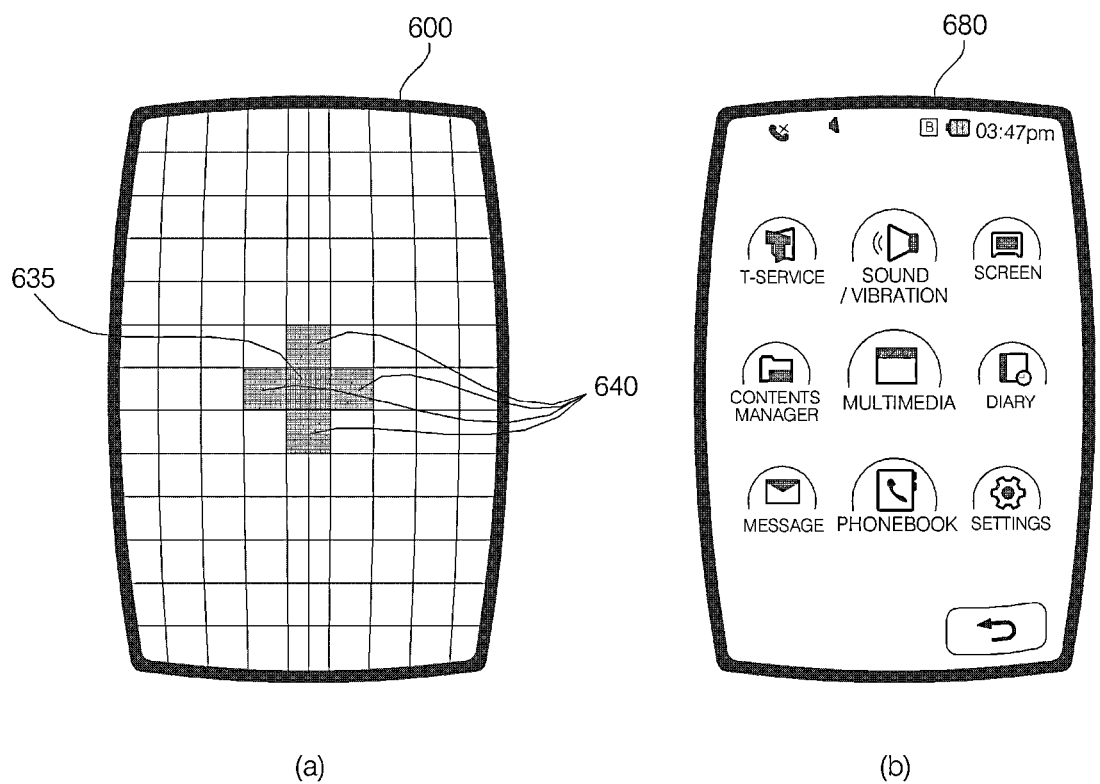

Referring to FIGS. 40(*a*) and 40(*b*), if the flexible display module is deformed such that a central part of the flexible display module can protrude, the touch sensitivity at the central part of the flexible display module may decrease. In this case, it is necessary to correct the touch parameters and thus to increase the touch sensitivity at the center of the flexible display module.

Figure 41:
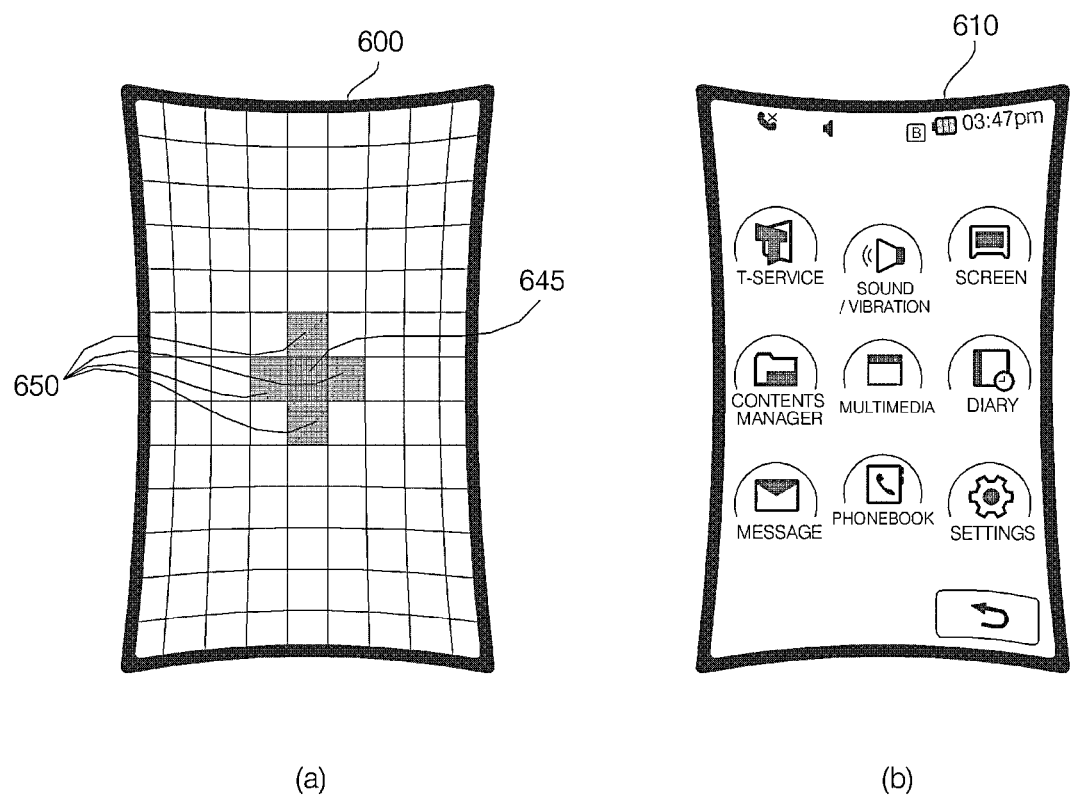

Referring to FIGS. 41(*a*) and 41(*b*), if the flexible display module is deformed such that the central part of the flexible display module can be recessed, the touch sensitivity at the central part of the flexible display module may increase. In this case, it is necessary to correct the touch parameters and thus to reduce the touch sensitivity at the center of the flexible display module.

In short, it is necessary to adjust the touch sensitivity of the flexible display module according to whether the flexible display module is bent or folded. In addition, it is also necessary to compensate the flexible display module for a difference, if any, between a touched point on the touch screen 600 and a touched point on the flexible display 610.

Figure 42:
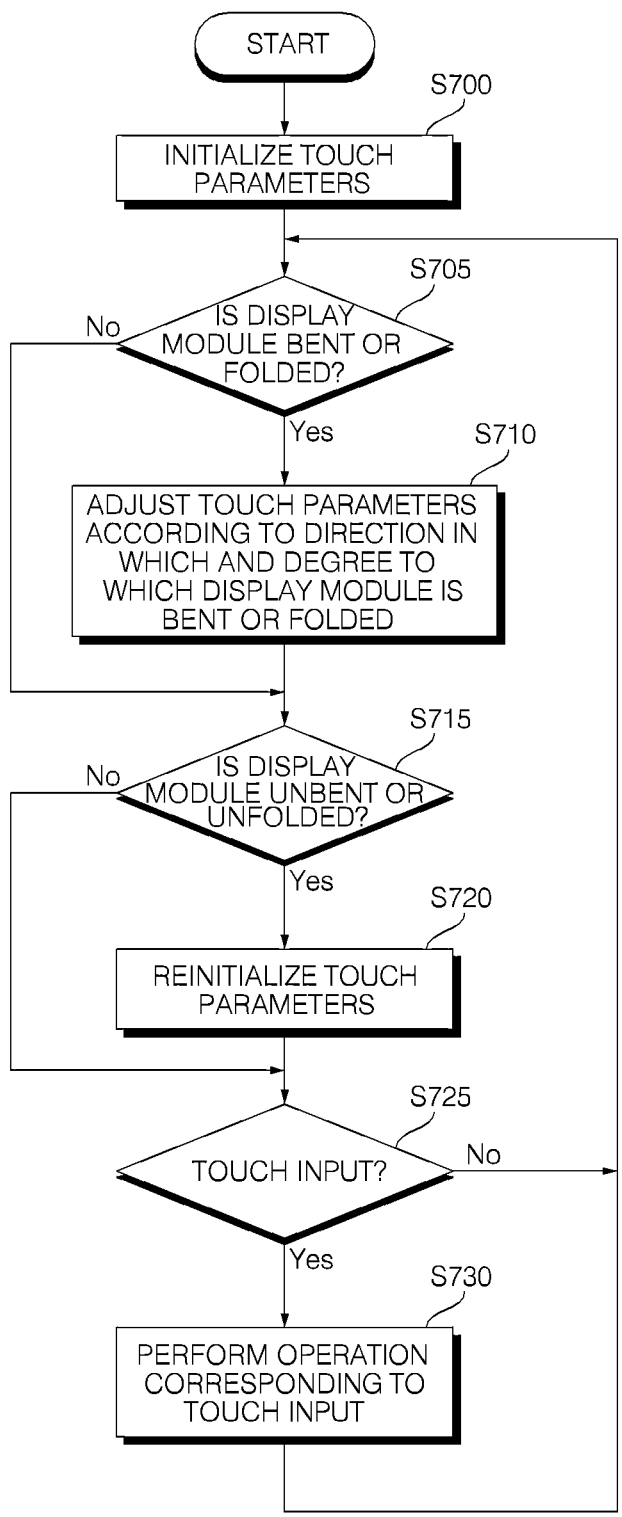
FIG. 42 illustrates a flowchart of a method of controlling a mobile terminal according to an exemplary embodiment of the present invention.

FIG. 42 illustrates a flowchart of a method of controlling a mobile terminal according to an exemplary embodiment of the present invention. Referring to FIG. 42, the controller 180 may initialize a set of touch parameters regarding the display module 151 (S700). The touch parameters may include a parameter specifying a touched point on the display module 151 and a parameter specifying the pressure at the touched point. The touch parameters may vary according to how the controller 180 recognizes a touch input.

Thereafter, the controller 180 may determine whether the display module 151 is bent or folded (S705). More specifically, the controller 180 may determine whether the display module 151 is bent or folded and which part of the display module 151 is bent or folded based on a sensing signal provided by the sensing unit 140.

If the display module 151 is determined to be bent or folded, the controller 180 may adjust the touch parameters according to the direction in which, and the degree to which the display module 151 is bent or folded (S710).

More specifically, the controller 180 may reduce or increase the touch sensitivity of the display module 151 and correct a touched point on the display module 151 in consideration of how the display module 151 is deformed. As the touch sensitivity of the display module 151 increases, the frequency of the generation of a touch event alert signal indicating the occurrence of a touch event may increase. Thus, when the touch sensitivity of the display module 151 is set high, the controller 180 may be sensitive enough to sense even a slight touch of the surface of the display module 151, such as a touch-flick input which is generated by scratching the surface of the display module 151 lightly with a finger, but the amount of data that needs to be processed per unit time by the controller 180 may increase.

Thereafter, the controller 180 may determine whether the display module 151 has returned to its original shape by being unbent or unfolded (S715). If the display module 151 is determined to have returned to its original shape, the controller 180 may reinitialize the touch parameters (S720).

On the other hand, if the display module 151 is determined yet to return to its original shape, the controller 180 may determine whether there is a touch input from the display module 151 (S725). Thereafter, if it is determined that there is a touch input from the display module 151, the controller 180 may control an operation corresponding to the touch input to be performed (S730). The controller 180 may also control a haptic effect corresponding to the touch input to be generated.

In this manner, it is possible to effectively perform an operation corresponding to a touch input regardless of whether the display module 151 is bent or folded.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to effectively control various operations associated with a touch event regardless of whether a display module is bent or folded by adaptively correcting the touch sensitivity of the display module or the position of a touched point on the display module according to whether and how the display module is bent or folded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal comprising a body and a display module that is located on the body, adapted to bend or fold, configured to receive a touch input, and comprises a top surface that displays information, the method comprising:
    setting a touch sensitivity of the display module to a first level when the display module is not bent or folded; and
    setting a touch sensitivity of a portion of the display module to a second level when the portion of the display module is bent or folded,
    wherein the second level corresponds to a direction and a degree of the bent or folded portion, is greater than the first level when the bent or folded portion protrudes outward towards the top surface, and is less than the first level when the bent or folded portion protrudes outward towards a rear surface.

2. The method of claim 1, further comprising:
    displaying one or more operation menu areas on the display module;
    detecting a touch input to at least one of the displayed one or more operation menu areas; and
    performing an operation corresponding to the at least one of the displayed one or more operation menu areas upon which the touch input is detected.

3. The method of claim 2, further comprising:
    detecting a touch input to the bent or folded portion; and
    correcting a position of the detected touch input according to the direction and the degree of the bent or folded portion.

4. The method of claim 2, further comprising:
    displaying an operation screen on the display module, the displayed operation screen indicating information related to an operation corresponding to the at least one of the displayed one or more operation menu areas.

5. The method of claim 2, further comprising:
    generating a haptic effect corresponding to the detected touch input.

6. The method of claim 1, wherein the body is bar-shaped and comprises at least a cylindrical-shaped portion, a cylindroid-shaped portion, a prism-shaped portion or a freestyle portion.

7. The method of claim 1, wherein the body is a folder-type and comprises at least a folding portion, a rolling portion or a hybrid portion that is a combination of the folding portion and the rolling portion.

8. A mobile terminal comprising:
    a body;
    a display module that is located on the body, adapted to bend or fold, is configured to receive a touch input, and comprises a top surface that displays information; and
    a controller configured to:
        set a touch sensitivity of the display module to a first level when the display module is not bent or folded, and
        set a touch sensitivity of a portion of the display module to a second level when the portion of the display module is bent or folded,
    wherein the second level corresponds to a direction and a degree of the bent or folded portion, is greater than the first level when the bent or folded portion protrudes outward towards the top surface, and is less than the first level when the bent or folded portion protrudes outward towards a rear surface.

9. The mobile terminal of claim 8, wherein the controller is further configured to:
    control the display module to display one or more operation menu areas;
    detect a touch input to at least one of the displayed one or more operation menu areas; and
    perform an operation corresponding to the at least one of the displayed one or more operation menu areas upon which the touch input is detected.

10. The mobile terminal of claim 9, wherein the controller is further configured to:
    detect a touch input to the bent or folded portion; and
    correct a position of the detected touch input according to the direction and the degree of the bent or folded portion.

11. The mobile terminal of claim 9, wherein the controller is further configured to:
    control the display module to display an operation screen indicating information related to an operation corresponding to the at least one of the displayed one or more operation menu areas.

12. The mobile terminal of claim 9, further comprising a haptic module, wherein the controller is further configured to control the haptic module to generate a haptic effect corresponding to the detected touch input.

13. The mobile terminal of claim 8, wherein the body is bar-shaped and comprises at least a cylindrical-shaped portion, a cylindroid-shaped portion, a prism-shaped portion or a freestyle portion.

14. The mobile terminal of claim 8, wherein the body is a folder-type and comprises at least a folding portion, a rolling portion or a hybrid portion that is a combination of the folding portion and the rolling portion.

* * * * *